US005574922A

United States Patent [19]
James

[11] Patent Number: 5,574,922
[45] Date of Patent: Nov. 12, 1996

[54] PROCESSOR WITH SEQUENCES OF PROCESSOR INSTRUCTIONS FOR LOCKED MEMORY UPDATES

[75] Inventor: David V. James, Palo Alto, Calif.

[73] Assignee: Apple Computer, Inc., Cupertino, Calif.

[21] Appl. No.: 261,168

[22] Filed: Jun. 17, 1994

[51] Int. Cl.$^6$ .............................. G06F 9/46; G06F 15/00
[52] U.S. Cl. ............................................ 395/561; 395/726
[58] Field of Search ..................................... 395/775, 200, 395/726, 200.08, 448, 477, 478, 479, 482

[56] References Cited

U.S. PATENT DOCUMENTS

| | | | |
|---|---|---|---|
| 4,725,946 | 2/1988 | Prange et al. | 395/775 |
| 4,847,754 | 7/1989 | Obermarck et al. | 395/650 |
| 4,959,777 | 9/1990 | Holman, Jr. | 395/325 |
| 5,283,870 | 2/1994 | Joyce et al. | 395/200 |
| 5,287,503 | 2/1994 | Narad | 395/425 |
| 5,341,491 | 8/1994 | Ramanujan | 395/425 |
| 5,367,693 | 11/1994 | Cassonnet et al. | 395/800 |
| 5,394,551 | 2/1995 | Holt et al. | 395/726 |

OTHER PUBLICATIONS

Micro Soft Press Computer Dictionary 1994 Page 30.
J. M. Stone, et al., "Multiple Reservations and the Oklahoma Update," *IEEE Parallel & Distributed Technology*, Nov. 1993, pp. 58–71.

*Primary Examiner*—Gopal C. Ray
*Assistant Examiner*—Paul R. Myers
*Attorney, Agent, or Firm*—David J. Larwood

[57] ABSTRACT

A system and method for executing sequences of instructions which can be used to access a memory location in a locked fashion. The first instruction specifies an address and sets a lock register which disables interrupts until it is cleared. The second instruction specifies an address and clears the lock register. The second instruction is not executed if the lock register was already cleared and doesn't update memory if the cache line of the first address is no longer valid. If the second address is not cacheable, the instructions are off-loaded to the bus interface and the results of the update are used to update the processor state. The present invention allows locked memory updates and process synchronization without locking of arbitrary duration of the entire shared data structure. The calculation and update of the data structure may continue after a context switch. The present invention is compatible with a wide range of cache-coherence protocols.

14 Claims, 20 Drawing Sheets

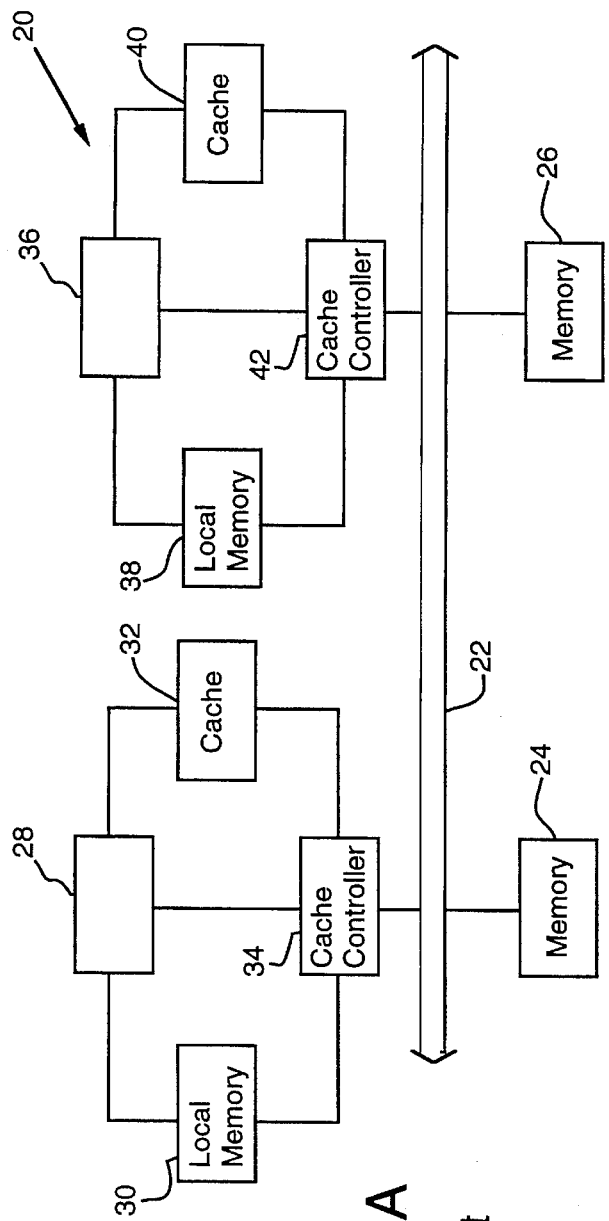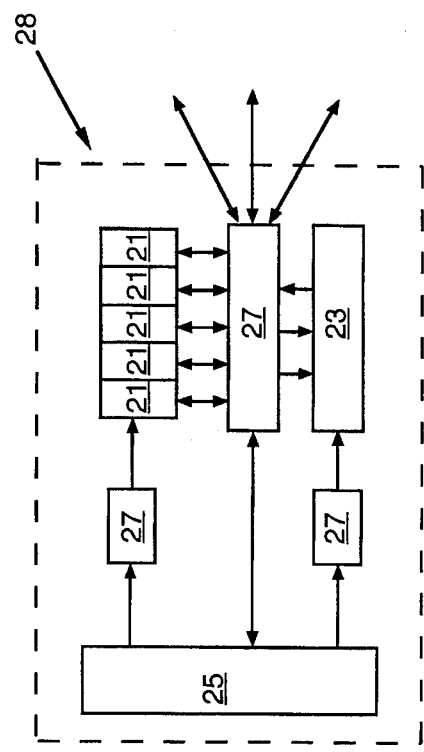
Figure 1A
Prior Art
Figure 1B
Prior Art

```
|<----------- inputs ---------------->|<------ outputs -------->|
                cmd     ab   eq   lt   ez  |  mA   mB   enbA  enbB  enbX  read
     COMPARE_SWAP_8      X    0    X    X     X    X    0     0     0     1
                         0    1    X    X     0    X    1     0     1     1
                         1    1    X    X     0    0    0     1     1     1
     MASK_SWAP_8         0    X    X    X     1    X    1     0     1     1
                         1    X    X    X     1    0    0     1     1     1
     FETCH_ADD_8         0    X    X    X     2    X    1     0     1     1
                         1    X    X    X     2    0    0     1     1     1

LESS_STORE_16       X    X    0    X     X    X    0     0     0     1
                         X    X    1    X     0    1    1     1     1     1
     ZERO_STORE_16       X    X    X    0     X    X    0     0     0     1
                         X    X    X    1     0    1    1     1     1     1
     COMPARE_FILL_16     X    0    X    X     X    X    0     0     0     1
                         X    1    X    X     0    2    1     1     1     1

WORD_LOAD_8         X    X    X    X     X    X    0     0     0     1
     WORD_STORE_8        0    X    X    X     0    X    1     0     1     0
                         1    X    X    X     0    0    0     1     1     0
     PAIR_STORE_16       X    X    X    X     0    1    1     1     1     0
```

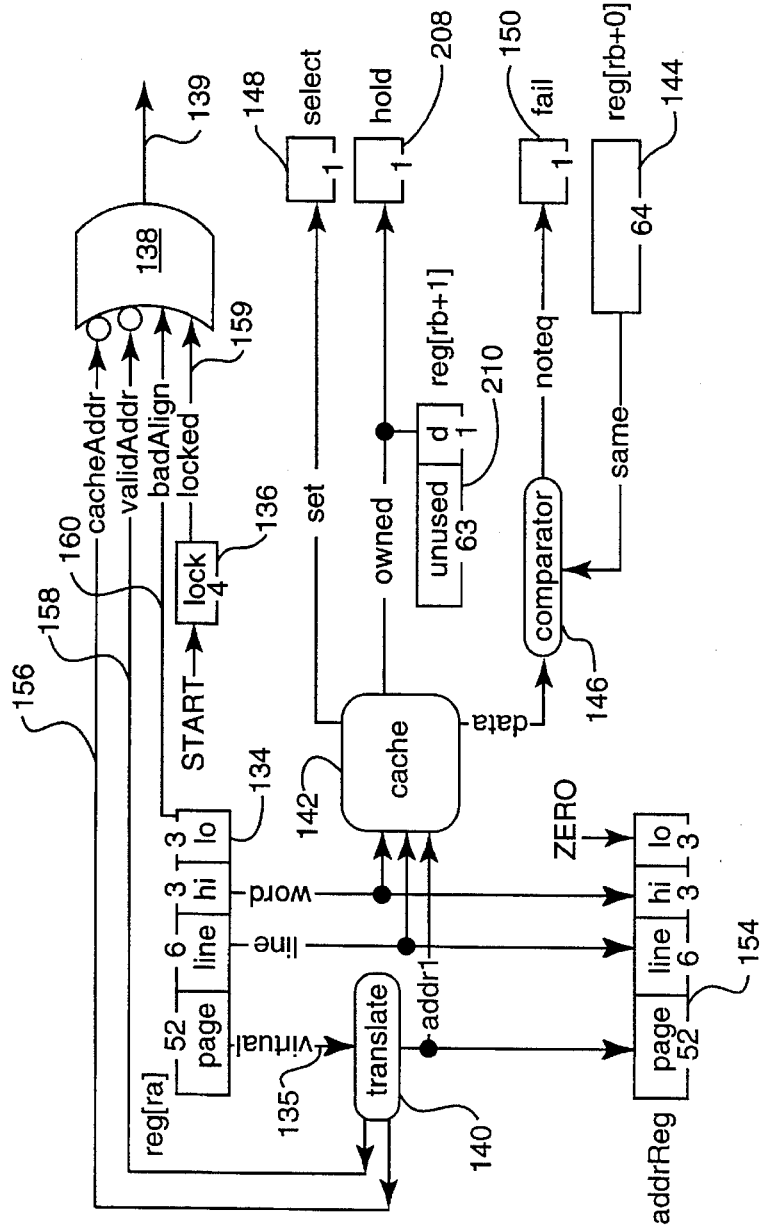
Figure 7A
Figure 7B

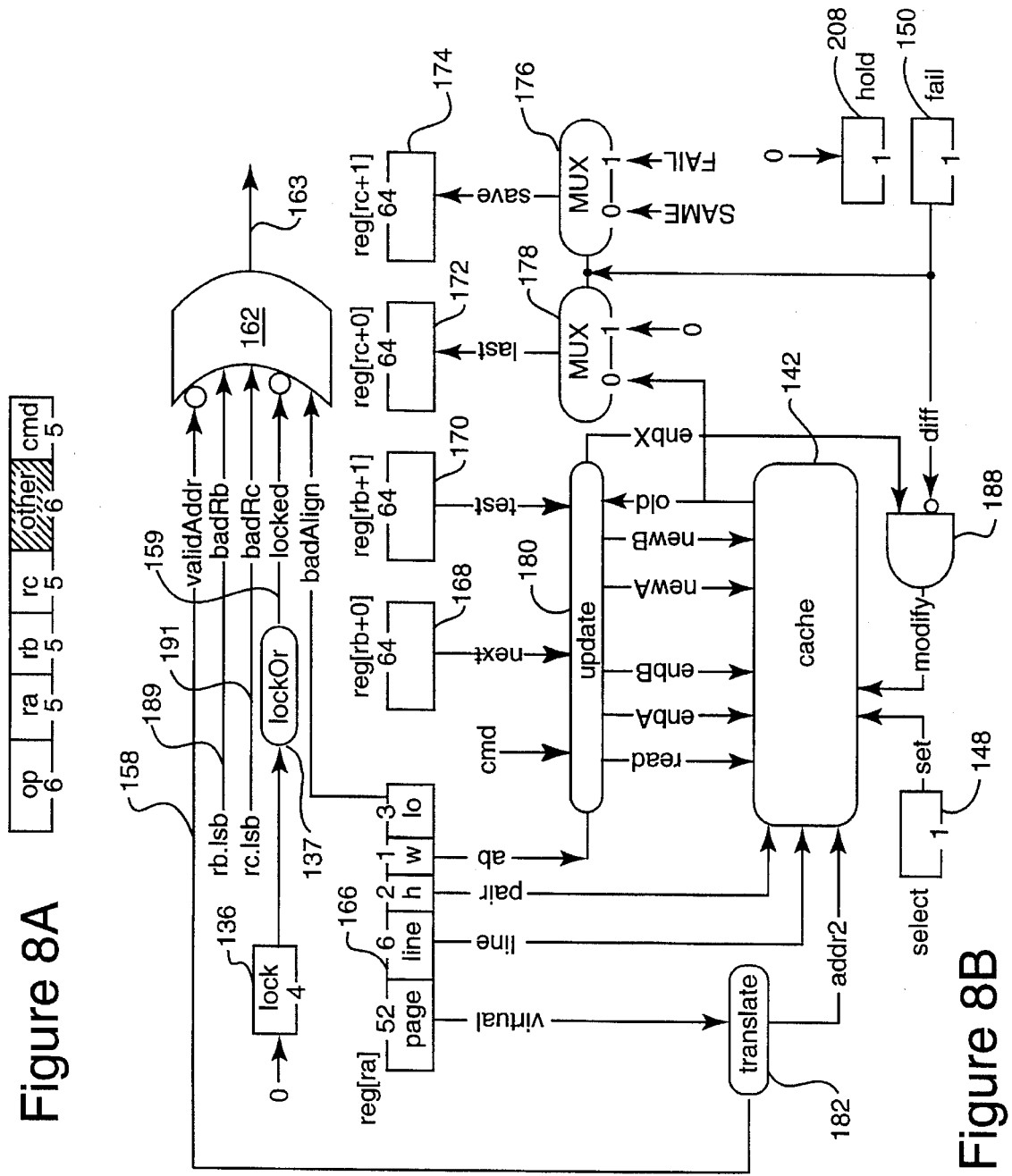

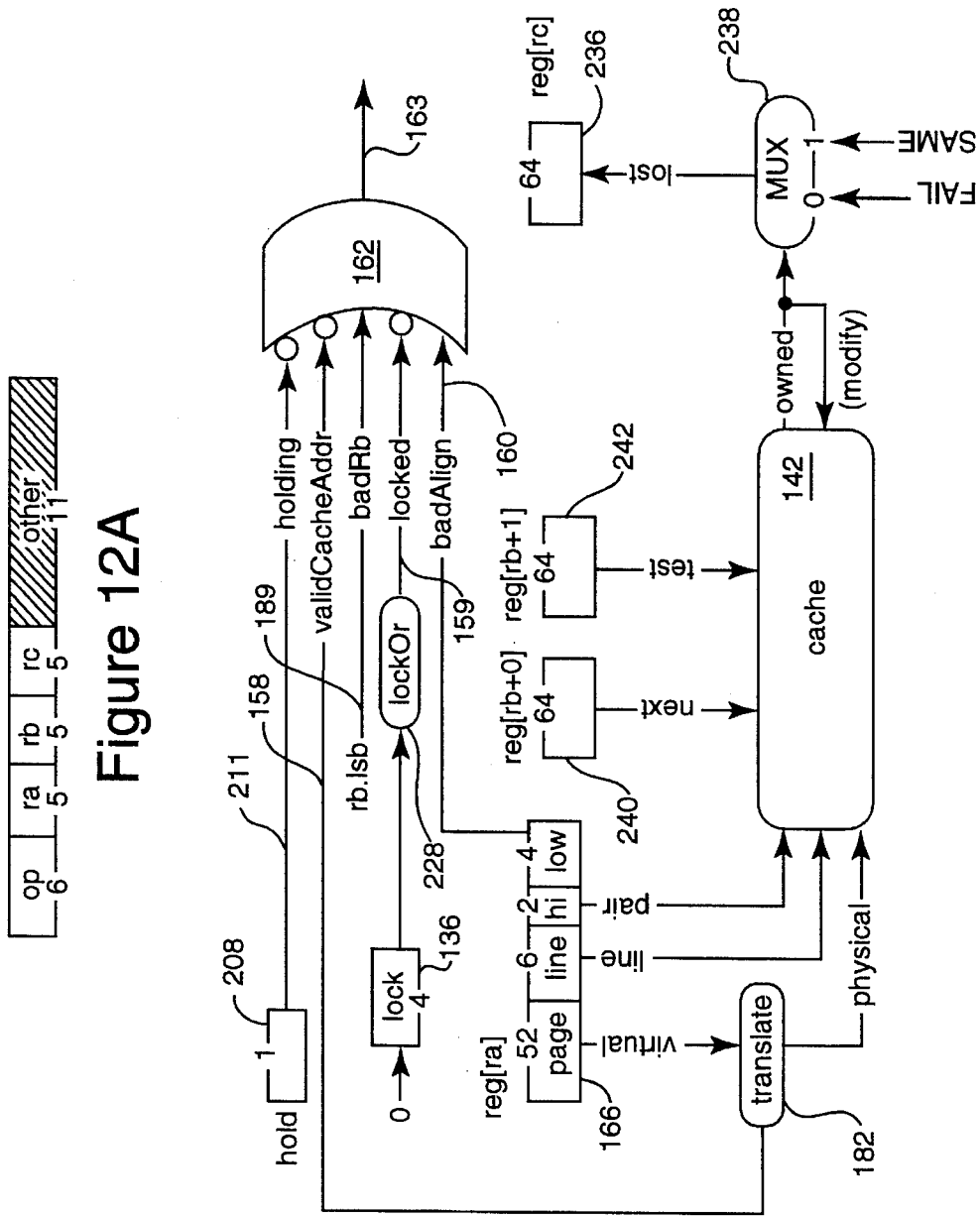

PROCESSOR WITH SEQUENCES OF PROCESSOR INSTRUCTIONS FOR LOCKED MEMORY UPDATES

BACKGROUND OF THE INVENTION

The present invention relates generally to systems and methods for executing processor instructions, and more particularly to systems and methods for executing locked memory updates using two or more processor instructions.

Most processor instruction-set architectures have been optimized for uniprocessor applications. Uniprocessors are computer systems using a single processor, but also containing main memory and input/output (I/O) devices. Uniprocessors often execute concurrent multiple processes by repeatedly switching between the processes, and synchronization between concurrent processes accessing shared data can be handled by the software, usually involving calls to the operating system.

Multiprocessor computer systems have more than one processor operating at the same time. Multiprocessors are increasingly being used to overcome the speed limitations of single processors executing instructions one at a time. The processors share one or more main memories. A bus interconnects the processors and the shared memories. The bus can usually perform only one data transfer at a time, but interconnections capable of performing more than one data transfer at a time are known. Even if the interconnection of the processors and shared memories may perform more than one data transfer at a time, accessing memory imposes delays and each shared memory can only process one processor request at a time, imposing additional delays when concurrent memory accesses are attempted.

The delays may be partly averted by providing the processors with local memories that can be accessed by only one processor and whose access does not involve the bus. Any data that is accessed by only one processor may be held in that processor's local memory instead of the shared memory. Accesses to this data do not slow down other accesses that are made to the shared memory.

Additional reductions in shared memory access delays may be accomplished by providing each processor with a cache and a cache controller. Each cache is used to hold cache lines (copies of sets of contiguous shared memory locations) containing shared memory data that was recently accessed by its associated processor. The next time the processor attempts to access data, a copy of which is in the cache, the access is made to the cache instead of the main memory, allowing other accesses to the shared memory by means of the bus. The cache needs to store both the data and its memory location.

As long as the memory data is only being read, or is accessed by only one processor, caching does not present any problems. A problem does arise, however, when a processor writes to a memory location that is also accessed by other processors. When this happens, other cache copies of the same data must be updated or invalidated. The shared memory copy of the data must also be updated, or marked as invalid and (if required by the coherence protocols) provided with a reference to the cache holding the up-to-date version of the data.

This problem, known as the cache-coherence problem, may be dealt with using cache-coherence protocols. For example, the number of processors able to read cached data may be left unlimited (they are said to have a "shared" cache state), but only one processor may be allowed to write data to the cache at any given time. The processor which may write data to the cache is said to "own" the cache. When a processor writes the data, it must acquire "exclusive" access to the cache. Converting to the exclusive state requires the invalidation of all other caches providing read access to the data, since they become stale (outdated).

In some coherence protocols, initially shared cache copies must be converted to owned before they may be written to and converted to the exclusive state. This conversion may involve changing the shared line to invalid and fetching the line in an owned state. Once a line is owned, it can be written, but once written, copies in other caches must be invalidated.

Caches allow data to be efficiently accessed by multiprocessors. However, to correctly utilize this sharing capability, multiprocessors require synchronization primitives (synchronization operations that are not implemented using simpler synchronization operations) to control access to shared data. For example, consider two processes concurrently updating a bank account, as illustrated in C language, in which →is used to indicate a member of a structure referenced with a pointer (variable whose value is a memory address), in Table 1.

Table 1: Inconsistent concurrent accesses

Process1:
    previous1=account1→balance;
    previous2=account2→balance;
    account1→balance=previous1+transfer;
    account2→balance=previous2−transfer;

Process2:
    temp1=account1→balance;
    temp2=account2→balance;
    combinedBalance=temp1+temp2;

If the second process reads one balance before it is updated and the other balance after it is updated, combinedBalance will be assigned an incorrect value. For example, if temp1 is read before account1→balance is updated and temp2 is read after account2→balance is updated, combinedBalance is assigned the incorrect value of (previous1+previous2−transfer) instead of the correct value of (previous1+previous2).

Incremental upgrades of instruction sets for synchronization within multiprocessor systems have typically included a single multiprocessor synchronization primitive. The test&set instruction, supported by Motorola, Inc., Schaumburg, Ill. on its MC68040 microprocessor instruction set, tests a memory value and sets it to a predetermined value; the load and clear instruction, supported by Hewlett Packard, Palo Alto, Calif. on its Precision Architecture RISC (PA-RISC) instruction set, clears a memory value and returns its previous value. Both have no arguments, but return a value. The compare&swap instruction, supported by SPARC International, Inc., on its 64-bit SPARC architecture instruction set, compares a memory location with a first argument, and if they are equal, swaps the content of the same memory location with the contents of a second argument. Also known are fetch&add, which returns the value of a memory location and updates it in memory by adding to it an argument, and mask&swap which unconditionally swaps a selected set of bits of a memory location (as specified by the first argument) with the corresponding bits of a second argument.

Mask&swap, fetch&add, and compare&swap form a useful basic set; the capabilities of one of these instructions cannot be easily emulated by the others. These basic operations can be performed on uncached as well as coherently-cached data.

Any of the above instructions can be used to implement a data structure called a "semaphore" that can be used to insure the integrity of shared data structures, as illustrated in Table 2. In an "indivisible" (or atomic) operation (operation during which no modification of the accessed data or reading of the data being updated may be done by a concurrently executing process), the SetLock() call sets a semaphore to a locked value and returns its previous (unmodified) value. The first process to execute this instruction sets the semaphore to a locked value; the second process is blocked until the first process restores an unlocked semaphore value.

Table 2: Serializing conflicting accesses

Process1:
   while (SetLock(&semaphore) !=UNLOCKED);
   previous1=account1→balance;
   previous2=account2→balance;
   account1→balance=previous1+transfer;
   account2→balance=previous2−transfer;
   semaphore=UNLOCKED;

Process2:
   while (SetLock(&semaphore) !=UNLOCKED);
   temp1=account1→balance;
   temp2 =account2→balance;
   combinedBalance =temp1+temp2;
   semaphore=UNLOCKED;

Explicit semaphore locking is sufficient for many applications. However, semaphores have limitations when used to lock more general database structures. Semaphores require explicit user program support. When data dependencies are poorly understood, global locks are typically used; these inhibit concurrent multiprocessor accesses. The failure or rescheduling of one process creates partially updated data structures. Thus, it can be seen that semaphore locking is unsafe.

A popular set of synchronization primitive instructions, supported by MIPS Technologies, Inc., Mountain View, Calif. on its MIPS RISC Instruction Set Architecture, by Motorola, Inc., Schaumburg, Ill. on its PowerPC 601 microprocessor, and Digital Equipment Corporation, Maynard, Mass. on its Alpha architecture, is safer when single cache lines are being updated. An initial LoadReserved instruction loads the value of a shared variable and places a reservation on its cache line, signifying an intention to later modify if the reservation is not lost. Intermediate instructions (such as add) compute a new data value. A final StoreConditional instruction saves the new data value in memory.

The operation of the StoreConditional instruction depends on the cache line's reservation state. If the reservation is still set, the StoreConditional updates the memory (with the new data value) and a successful status code is returned. Otherwise, the reservation has been lost, the memory update is nullified and an unsuccessful status code is returned. In typical uses, the StoreConditional status is checked and, if an unsuccessful status code has been returned, the initial LoadReserved and intermediate instructions are repeated until a successful status is returned.

Reservations are lost when data is written into the reserved address by another processor, when the cache-line is deleted from the cache, or when the executing process is context switched (there is a break in its execution during which another concurrent process is executed by the same processor).

By placing the appropriate computation instructions between the LoadReserved and StoreConditional instructions, cache-line reservations can be used to serialize accesses to a single variable. For example, code for a Process3 accessing only one variable is illustrated in Table 3. When access to more than one variable must be serialized, a semaphore must be implemented and locking must be used as described above.

On line 3 of Table 3, the LoadReserved instruction reads the value of totalAddress, writes the value into previous, and places a reservation on the cache line of totalAddress. An updated value of totalAddress, sum, is calculated on lines 4–7. On line 8, the value of sum is written into totalAddress if the reservation of the cache line of totalAddress has not been lost as a result of a write by another process, deletion from the cache, or context switch of the executing process. This is done by the StoreConditional instruction, which also sets a variable lost to a status which is LOST if and only if the reservation has been lost.

TABLE 3

Process3, using cache reservations

```
totalAddress = &(account1->balance);
do {
        previous = LoadReserved(totalAddress);
        if (previous < minimum)
                deduction = debit + serviceCharge;
        else
                deduction = debit;
        sum = previous − deduction;
        lost = StoreConditional(totalAddress, sum);
} while (lost != LOST);
```

Cache-line reservations are attractive because a wide variety of synchronization operations can be created by placing the appropriate computation instructions between the LoadReserved and StoreConditional instructions. However, this may be done only when a single cache line is to be accessed. Also, forward progress (eventual successful execution and conclusion of the shared memory access section) is guaranteed only if caches transition between the shared and exclusive states. As mentioned in the earlier discussion of cache coherence, some protocols require an intermediate invalid state between the shared and the exclusive states, which is incompatible with the forward progress requirement. Another disadvantage is the loss of reservations during a process context switch.

Accordingly, an object of the present invention is to provide a processor and method for process synchronization without locking of arbitrary duration of the entire shared data structure.

Another object of the present invention is to provide a system and method for process synchronization permitting a data structure update started by one process to be finished by another process.

A further object of the present invention is to provide a system and method for process synchronization permitting the calculation and update of a data structure to continue after a context switch.

Yet another object of the present invention is to provide a system and method for process synchronization compatible with a wide range of cache-coherence protocols.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a system and method for executing two or more instructions which can be used to access memory locations in a locked fashion, i.e., perform accesses that are not successful if a modification by another process occurs during the accesses.

The present invention is directed to a processor having a set of machine language instructions, a set of registers (memory locations internal to the processor), an arithmetic logic unit (ALU), switching devices, a lock register, and a control unit. The control unit services interrupts only when the lock register has one of a unlocked set of values. Each machine language instruction belongs to one of three sets. The first set of instructions sets the lock register to predetermined locked values not in the set of unlocked values. The second set of instructions leaves the lock register with a value in the set of unlocked values if it has a value in the set of unlocked values, and changes it in a predetermined fashion if it does not have a value in the first set of values. The third set of instructions sets the lock register to a value in the set of unlocked values.

The method of the present invention includes reading the content of a first address and setting a lock register to disable interrupts if the first address is cacheable, in a first machine language instruction. As part of a subsequent machine language instruction, if the lock register is not yet set to a value allowing interrupts and the cache line of the first address is still valid, the first or a second address is accessed and the lock register is set to a value allowing interrupts.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1A is a schematic block diagram of a multiprocessor system.

FIG. 1B is a schematic block diagram of processor 28 of FIG. 1A.

FIG. 7A is a diagram of the format of a PrepTest8 instruction.

FIG. 7B is a block diagram of part of the hardware needed to execute the PrepTest8 instruction.

FIG. 8A is a diagram of the format of a PostLock8 instruction.

FIG. 8B is a block diagram of part of the hardware needed to execute the PostLock8 instruction.

FIG. 12A is a diagram of the format of a PostStore16 instruction.

FIG. 12B is a block diagram of part of the hardware needed to execute the PostStore16 instruction.

DESCRIPTION OF THE PREFERRED EMBODIMENT

Figure 2A:
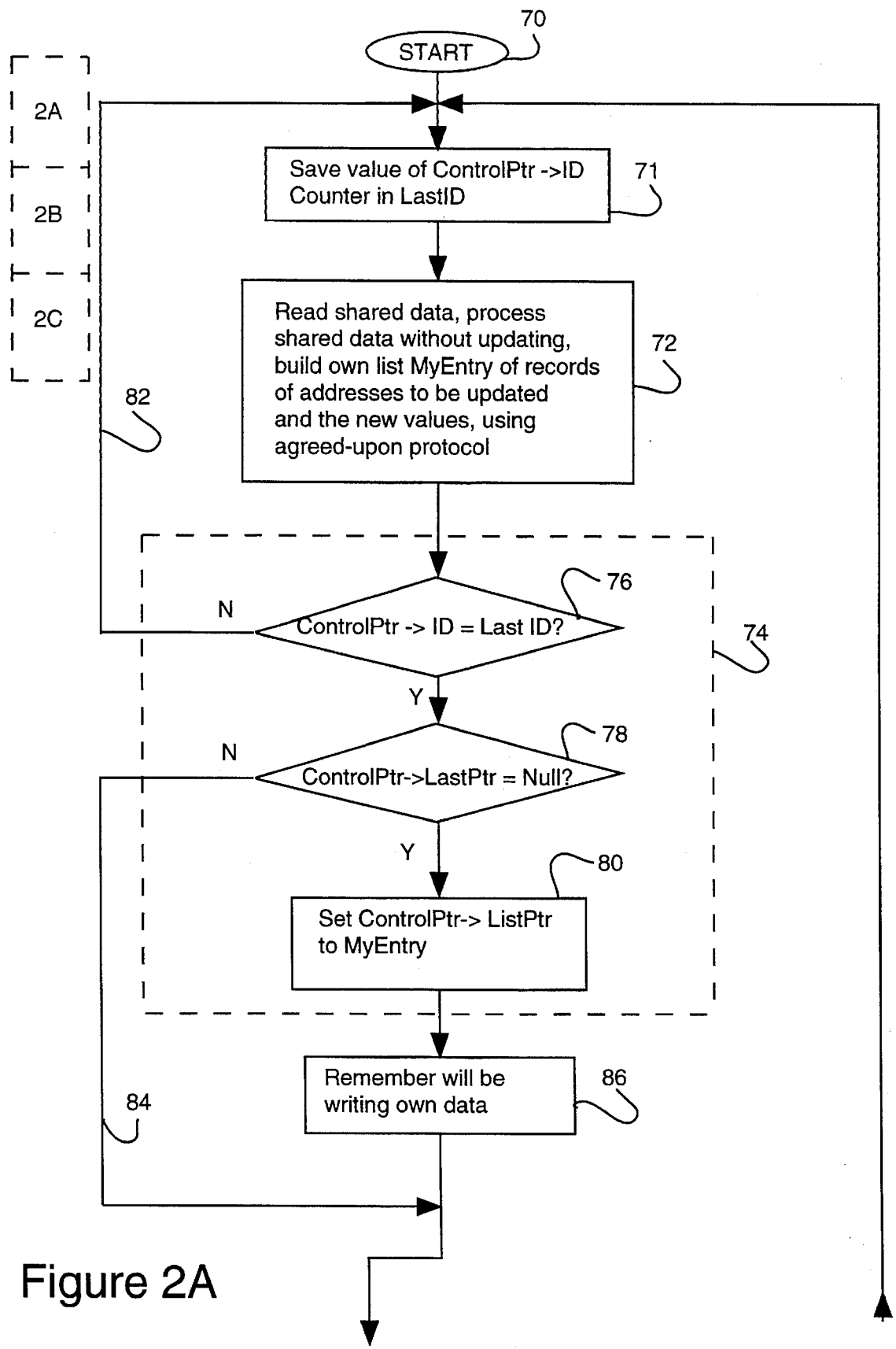
FIGS. 2A, 2B and 2C are contiguous portions of a flow chart of a process using the present invention for serialized access to shared data.

The present invention will be described in terms of the preferred embodiment. The preferred embodiment is an apparatus and method for conditional locked memory updates.

Before discussing the details of the preferred embodiment of the present invention, the structure of a multiprocessor system will be described. FIG. 1A is a schematic block diagram of a portion of a multiprocessor 20 with which the present invention may be practiced. Multiprocessor 20 comprises two processors 28 and 36.

As is well known and shown in FIG. 1B, the processors each include a set of registers 21, an arithmetic logic unit (ALU) 23, and a control unit 25. A more detailed description of a processor is given in *Computer Architecture: a quantitative approach* by David A. Patterson and John L. Hennessy, Morgan Kaufmann Publishers, Inc, Palo Alto, Calif. 1990, pp. 139–167, 199–204, which is hereby incorporated by reference. The control unit 25 decodes the machine language instructions and controls a set of switches 27 used to interconnect and to activate the other components of the processor. In response to signals called interrupts, the control unit switches from a program being executed at the time of the interrupt to an interrupt handling routine. Some interrupts originate outside the processor, while others, also known as traps, occur when special situations arise inside the processor.

The processors share one or more shared memories, 24 and 26 in FIG. 1A. A bus 22 interconnects processors 28 and 36 and memories 24 and 26. Processors 28 and 36 have local memories 30 and 38. Processors 28 and 36 also have caches 32 and 40 with cache controllers 34 and 42, respectively. The local and shared memories may be physically distinct components, or separate partitions of one physical memory component. It is assumed that a cache coherence protocol maintains consistency between the caches and the shared memory. The present invention can be practiced regardless of the details of the cache coherence protocol. It is assumed that the data and addresses of system 20 are 64-bit wide but the present invention can be practiced with any word sizes.

The largest possible set of memory addresses that can be addressed by a processor is called its address space. The actual physical memory present is usually smaller in size than the address space of the processor. Additional memory, up to the limit of the address space of the processor may be simulated using a mass storage device such as a disk drive and a virtual memory mechanism.

Virtual memory is implemented by dividing the address space of the processor and the physical memory into blocks of addresses of equal size, called pages. Each page of the processor address space is stored either in a page of the physical memory or on the disk drive. Pages on the disk drive may not be accessed by the processor until they are moved to the physical memory. Once in physical memory, the address in the processor address space, called the virtual address, may be translated into the corresponding address in physical memory by virtual memory hardware which looks up the physical memory page corresponding to a virtual address page in a processor-local table called a translation look-aside buffer (TLB).

When an access to a virtual address with no corresponding physical address is attempted, a trap is generated, resulting in suspension of normal program execution and transfer of control to a trap handler routine. The routine reads the needed page from the disk into the physical memory (if necessary), updates the TLB and returns control to the suspended program.

Illustrated in Tables 4 and 5, FIGS. 2A–2C and 3, and the text that follows is a program that utilizes conditional locked memory update instructions. This illustration is followed by software and hardware implementations of such instructions according to the teachings of the present invention.

Figure 2B:
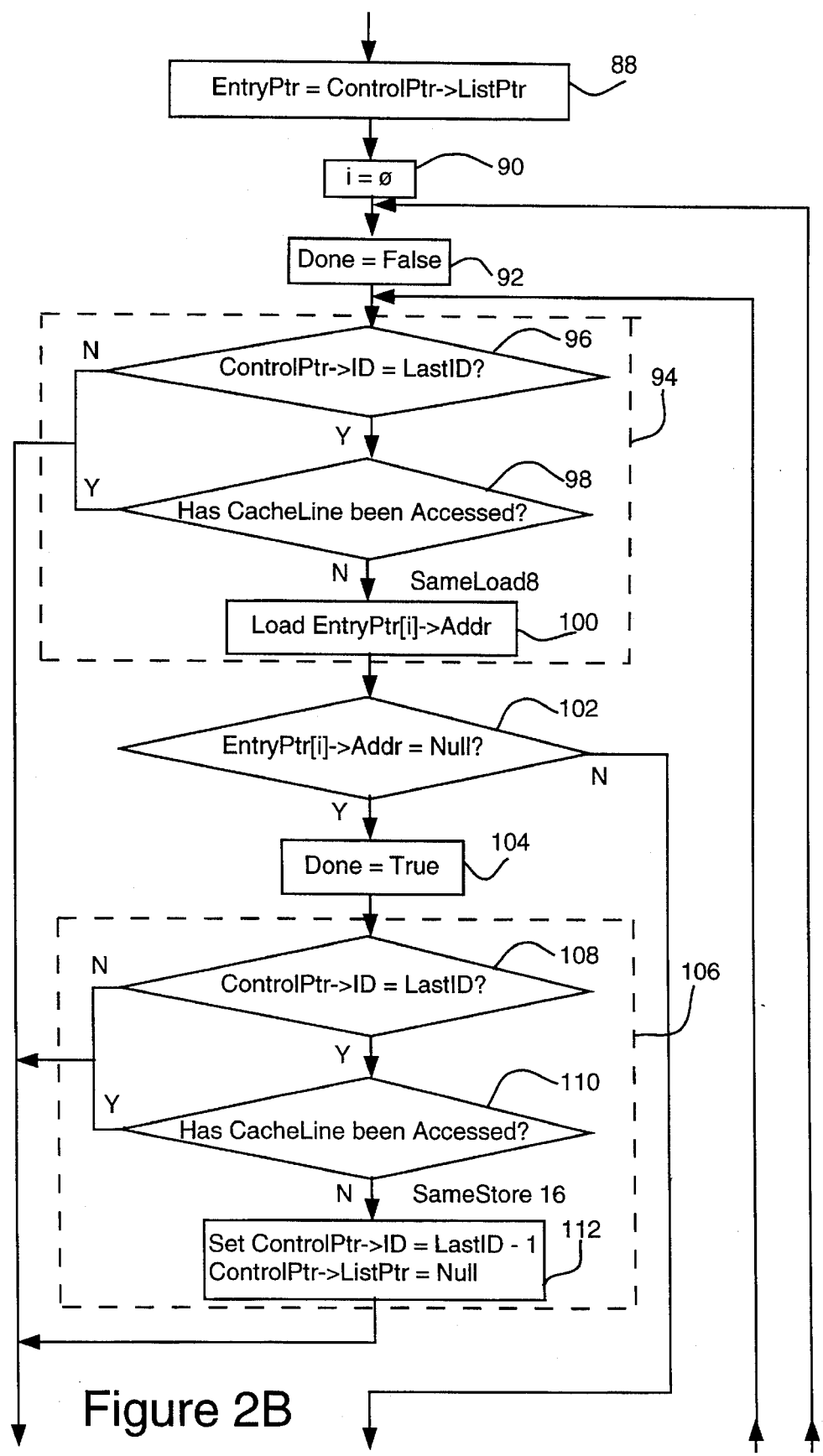
Figure 2C:
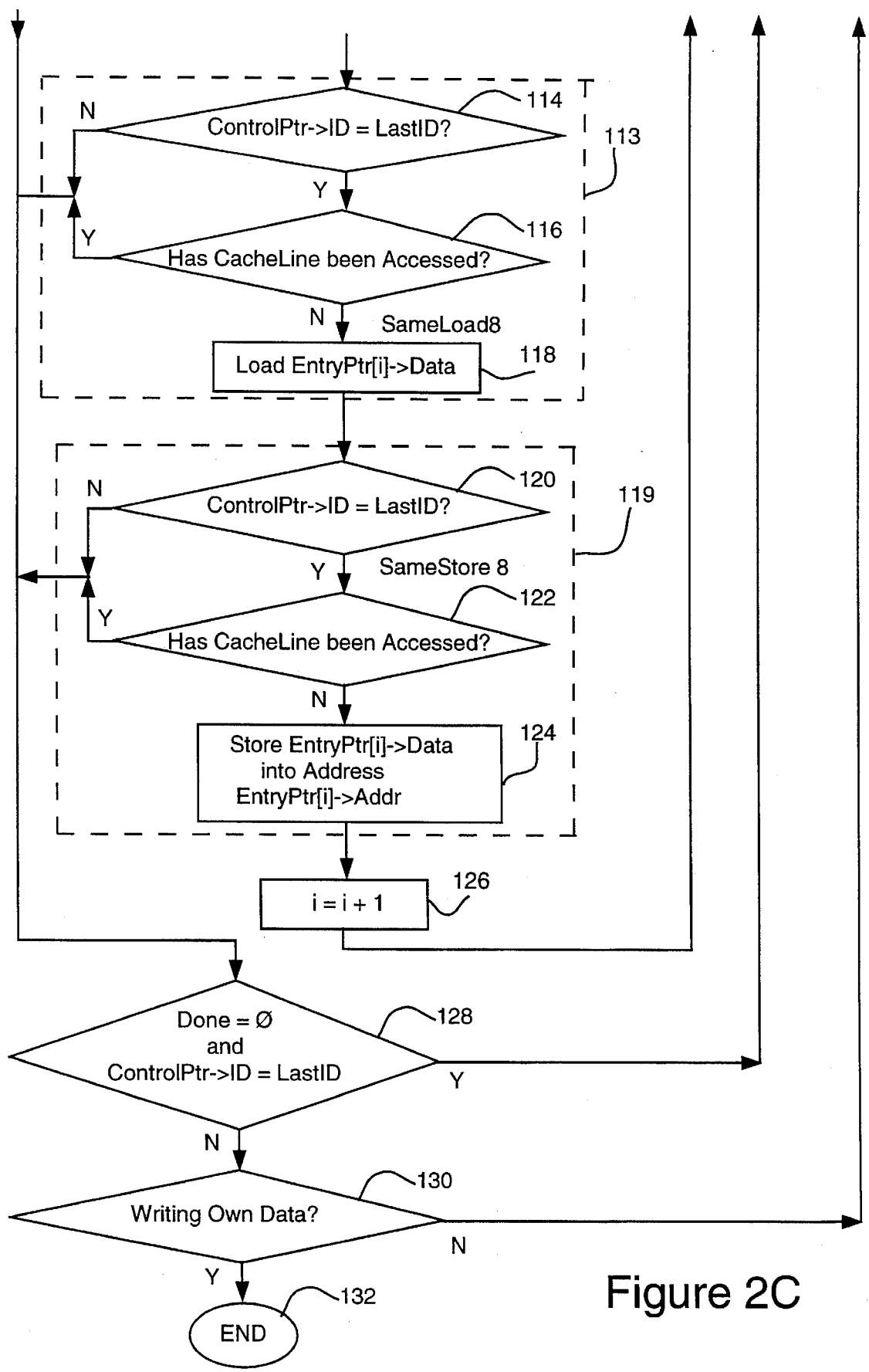
Figure 3:
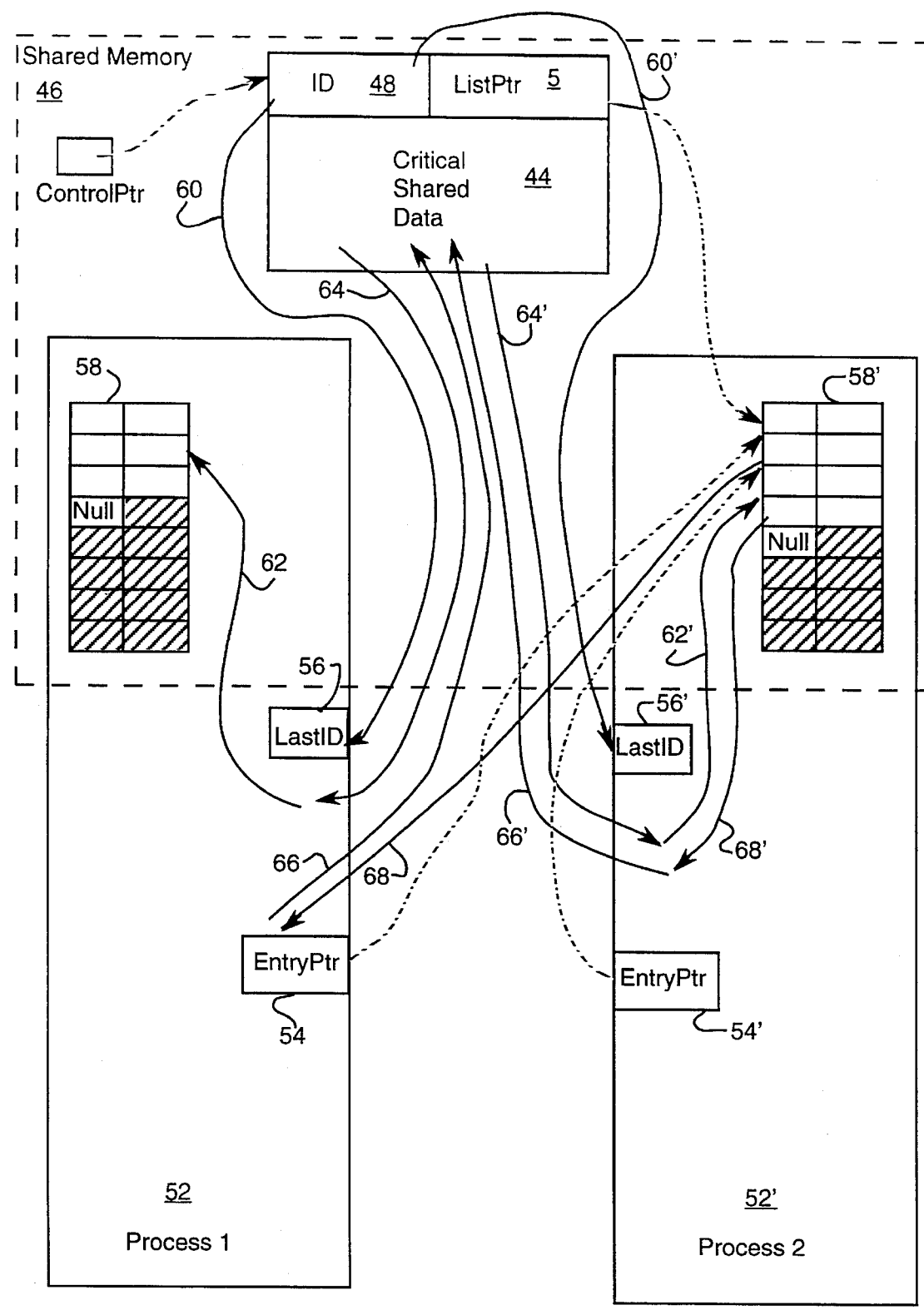
FIG. 3 is a schematic block diagram of two processes using the present invention for serialized access to shared data.

FIGS. 2A–2C are a flow chart of the process of either of the Tables 4 and 5, and FIG. 3 is a block diagram of the concurrent execution of the processes of Tables 4 and 5. It is assumed that the processors executing processes 1 and 2 provide the following four instruction sequences: SameCSwap, SameLoad8, SameStore8 and SameStore16. Each instruction sequence consists of a test for equality of an address contents with a test value followed, if successful, by access of a memory location that may be different from the address that was tested. Sequences rather than single instructions are used because most processors do not allow simultaneous access to two memory locations, especially if they are in different cache lines.

SameCSwap(address1, data1, address2, data2, test) conditionally updates address2 and sets two processor registers named results.fail and results.old. In a first instruction, the contents of address1 are compared with data1, and, if they are not equal, results.fail is set to value FAIL. Subsequent to this test, when the second instruction of the sequence is ready to be executed (which may be some time later if a cache line must be fetched by the second instructions), a determination is made of whether address1 has been written to since the first comparison occurred. If address1 has been written to, results.fail is again set to the value FAIL. If results.fail is set to FAIL, no memory update is executed. Otherwise, a Compare and Swap instruction is executed as follows. The results.old value is set to the contents of address2. The contents of address2 is compared with the value of test and the instruction ends if they are not equal. If the contents of address2 is equal to test, data2 is written to address2, and results.fail is set to indicate that the instruction was successful by assigning it a value other than FAIL.

SameLoad8(address1, data1, address2) conditionally reads the value at address2. This instruction is similar to SameCSwap, but the Compare and Swap instruction is replaced with loading (reading) the contents of address2 into register results.old. In a first instruction, the contents of address1 are compared with data1, and, if they are not equal, results.fail is set to value FAIL and the instruction ends. Subsequent to this test, when the second instruction of the sequence is ready to be executed, a determination is made of whether address1 has been written to since the first comparison occurred. If address1 has been written to, results.fail is again set to the value FAIL and the instruction sequence ends. Otherwise, a Load instruction is executed, i.e., results.old is set to the contents of address2, and results.fail is set to indicate that the instruction was successful by assigning it a value other than FAIL.

SameStore8(address1, data1, address2, data2) conditionally writes a value at address2. This instruction is similar to SameLoad8, but the loading of data from address2 is replaced with storing data from register data2 into address2. In a first instruction, the contents of address1 are compared with data1, and, if they are not equal, results.fail is set to value FAIL and the instruction ends. Subsequent to this test, when the second instruction of the sequence is ready to be executed, a determination is made of whether address1 has been written to since the first comparison occurred. If address1 has been written to, results.fail is again set to the value FAIL. If results.fail is set to FAIL, no memory update is executed. Otherwise, a Store instruction is executed: results.old is set to the value of zero, data2 is written to address2, and results.fail is set to indicate that the instruction was successful by assigning it a value other than FAIL.

SameStore16(address1, data1, address2, data2, data3) conditionally writes two words to two contiguous addresses, the lowest of which is specified by the 16- byte-aligned address2. This instruction is similar to SameStore8, with the difference that instead of one word, two contiguous words are being stored. In a first instruction, the contents of address1 are compared with data1, and, if they are not equal, results.fail is set to value FAIL and the instruction ends. Subsequent to this test, when the second instruction of the sequence is ready to be executed, a determination is made of whether address1 has been written to since the first comparison occurred. If address1 has been written to, results.fail is again set to the value FAIL. If results.fail is set to FAIL, no memory update is executed. Otherwise, a Store instruction is executed: results.old is set to the value of zero, data2 is written to address2, data3 is written to (address2 +8), and results.fail is set to indicate that the instruction was successful by assigning it a value other than FAIL. For all of these instruction sequences, no update is performed and a distinct results.fail code is returned if the first address1 value is a bad virtual address (as opposed to an unloaded page table entry).

FIG. 3 is a block diagram of software and data structures that may run on the hardware whose block diagram was shown in FIG. 1A. As shown in FIG. 3, the data 44 whose access must be serialized is kept in shared memory 46. Single copies of two other shared variables, controlPtr→id 48 and controlPtr→listPtr 50 are maintained with data 44. A plurality of processes such as Process1 52 and Process2 52' attempt to use data 44. Process1 52 maintains some data such as data 54 and 56 outside of shared memory 46, and some data such as update data structure 58 in shared memory and therefore accessible by other processes, such as Process2. Process2 maintains similar data 54', 56' and 58'. The intended effects of Process1 and Process2 are those discussed above in relation to Table 1. Table 4 is a pseudocode listing of Process1, and Table 5 is a pseudocode listing of Process2. FIGS. 2A–2C form a flowchart of Process1 and Process2. All the details specific to the data-access operations are represented by box 72 of FIG. 2A. The rest of the flowchart describes the algorithm used in each of Process1 and Process2 to regulate access to data 44.

ControlPtr→id is a counter used to give a unique identifier to each indivisible access to and update of data 44. After each indivisible update of data 44, controlPtr→id is incremented and controlPtr→listPtr is set to NULL. During an update, controlPtr→listPtr points to an update data structure (by way of example 58' in FIG. 3) containing the new data values and the addresses to be updated. Update data structure 58' built by Process2 and its counterpart update data structure 58 built by Process1 are lists of address-data pairs shown schematically in FIG. 3 as two-column tables. The end of the lists is marked by setting the address to NULL. As shown in Tables 4 and 5, the lists may be generated by writing to arrays myEntry[] of sufficient size to hold the lists, of elements of the natural word size of the processor (typically 4 or 8 bytes). Alternatively, a variable length array of elements of the minimum size allowed by the processor (typically one byte) provides flexibility in the type and size of data to be updated, since the data can always be regarded as a collection of the minimum-size words.

At any given time, any number of processes may be reading data 44 and building an update data structure such as 58 and 58', as indicated by arrows 64, 62, 64' and 62' in FIG. 3. Before reading data 44, each process stores the value of controlPtr→id in a location lastId (56, 56' in FIG. 3), as shown by arrows 60, 60' in FIG. 3. This is shown by box 71 of FIG. 2A and lines 9 in Tables 4 and 5.

If all of data that is being read from shared data structure 44 to memory belonging to a particular process is read while controlPtr→listPtr is NULL, the data is in a consistent state. The value of controlPtr→id will not change during this time. Since Process1 and Process2 read all the data they need before updating data 44 (this is a requirement for the indivisible update implemented by this example to work), at least one process will read the data it needs in a consistent state. As indicated earlier, box 72 of FIG. 2A represents the reading of the necessary data and the building of a data structure containing the addresses to be updated and the updated values. These steps are given by lines 10–16 of Table 4 and 10–13 of Table 5.

One and only one process that has read data 44 and built an update data structure must then be able to change controlPtr→listPtr from NULL to the address of the process' update data structure. ControlPtr→id is then incremented and controlPtr→listPtr is simultaneously reset to NULL, which does not allow other processes, that had read their data before the reset operation, to write their updated values. This requires an atomic conditional update operation which changes controlPtr→listPtr only if it is NULL to begin with and controlPtr→id is equal to the lastId value of the process. Such a conditional update is box 74 of FIG. 2A, corresponding to the SameCSwap instruction at line 17 of Table 4 and line 14 of Table 5.

As discussed above and shown by box 76 of FIG. 2A, this operation fails if controlPtr→id is not equal to lastId. In this case, an update by another process has not only begun, but also ended. As shown by arrow 82 of FIG. 2A, lines 18 of Tables 4 and 5, the process begins reading and updating the data anew.

If controlPtr→id is equal to lastId but controlPtr→listPtr is not NULL (test 78 of FIG. 2A), an update by another process has started but not yet ended. In this case, the process sets the variable writingMine to FALSE at lines 19, Tables 4 and 5 (but not shown in FIGS. 2A–2C), and, as indicated by arrow 84 of FIG. 2A, begins copying data from the structure pointed to by controlPtr→listPtr to memory locations 44 at lines 20, Tables 4 and 5. This is another process' update.

If the SameCSwap operation succeeds (controlPtr→id is still equal to lastId and controlPtr→listPtr is still NULL), box 80 of FIG. 2A is executed and the variable writingMine is set to TRUE at lines 19, Tables 4 and 5 (box 86, FIG. 2A). The process then begins copying data from the structure pointed to by controlPtr→listPtr to memory locations 44. This is this process' own update.

All processes execute the same update concurrently until one of them finishes the update. This insures that other processes are not kept waiting by a partially completed update started by a process that is not currently being executed.

The copying of the data from the update data structure to memory locations 44 is indicated by arrows 68, 66, (doing the other process3 update), 68' and 66' (doing their process3 update) of FIG. 3. First, a variable entryPtr (54, 54', FIG. 3) different for each process is set to the value of controlPtr→listPtr at lines 20, Tables 4 and 5 (box 88, FIG. 2B). Two nested loops (the outer loop on lines 22–42, and the inner loop on lines 24–39, Tables 4 and 5) and an index variable i are used to scan the update data structure being copied (58', FIG. 3). Variable i is manipulated at box 90, FIG. 2B, box 126, FIG. 2C, lines 21 and 38, Tables 4 and 5. Before the inner nested while loop, a variable, done, is set to the default of FALSE (box 92, FIG. 2B).

Then a conditional locked reading of an address to be updated is attempted at lines 25, Tables 4 and 5 (box 94 FIG. 2B). If the tests of boxes 96 and 98, FIG. 2B indicate that the instruction should fail, the inner loop is exited, and if the failure was not induced by false sharing the outer loop is exited as well (box 128, FIG. 2C). Otherwise, the address is read (box 100, FIG. 2B). The address is then tested against NULL to detect the end of the data structure (box 102, FIG. 2B). The case of the address being NULL will be described after the more common case of its being a valid address. The value to be stored at the address is conditionally read next in a locked fashion at lines 33 Tables 4 and 5), similar to the case of the address described above. The failure of the instruction is handled in the same way as the failure of the address read above. This is shown by boxes 113, 114, 116 and 118 in FIG. 2C. After both the data and the address have been read, the data is conditionally stored in a locked fashion at the address at lines 36, Tables 4 and 5, similar to the reads described above, as indicated by boxes 119, 120, 122 and 124 of FIG. 2C.

When the end of the data structure is detected at box 102 of FIG. 2B, the variable done is set to TRUE (box 104, FIG. 2B) to indicate that no false sharing occurred and that both loops should be exited. Before exiting the loops, controlPtr→listPtr must be reset to NULL and controlPtr→id must be incremented. This update must be carried out indivisibly and conditional on controlPtr→id not having already been incremented by another process. This is indicated by boxes 106, 108, 110 and 112 of FIG. 2B, and lines 30 of Tables 4 and 5.

As shown above, the copying of the update data structure by all processes ends when it is finished by one process and detected by the others. For the process whose update data structure has been copied, the memory access and update is complete. The other processes must reattempt the memory access and update, as indicated by box 130 of FIG. 2C, and lines 43 of Tables 4 and 5.

If a process whose update data structure is being copied is terminated, its update data structure must be retained in shared memory 46 until it is fully copied. The copying must be continued by code invoked by the operating system.

TABLE 4

Process1 according to the present invention

```
/* controlPtr is a 16-byte aligned address; at that address there are:
 *      id - a unique number which is incremented after each data update.
 *      listPtr - the address of an array of address/data entries. */
Process1:
    idPtr = AddressOf(controlPtr->id);
    usePtr = AddressOf(controlPtr->listPtr);
    do {
        do {
            lastId = controlPtr->id;
            previous1 = account1->balance;
            previous2 = account2->balance;
            myEntry[0]->addr = AddressOf(account1->balance);
            myEntry[0]->data = previous1 + transfer;
            myEntry[1]->addr = AddressOf(account2->balance);
            myEntry[1]->data = previous2 - transfer;
            myEntry[2]->addr = NULL;
            results = SameCSwap(idPtr, lastId, usePtr, myEntry, NULL);
        } while (results.fail == FAIL);
        writingMine = (results.old == NULL);
        entryPtr = ContentsOf(usePtr);
        i = 0;
        do {
            done = FALSE;
            while (FOREVER) {
                results = SameLoad8(idPtr, lastId, AddressOf(entryPtr[i]->addr));
                if (results.fail == FAIL) break;
                oldAddr = results.old;
                if (oldAddr == NULL) {
                    done = TRUE;
                    SameStore16(idPtr, lastId, usePtr, lastId+1, NULL);
                    break;
                }
                results = SameLoad8(idPtr, lastId, AddressOf(entryPtr[i]->data));
                if (results.fail == FAIL) break;
                oldData = results.old;
                results = SameStore8(idPtr, lastId, oldAddr, oldData);
                if (results.fail == FAIL) break;
                i = i + 1;
            }
            /* Check for false-sharing induced failures. These could occur when
             * the id/listPtr and account values are within the same cache line*/
        } while ((done == FALSE) && (ContentsOf(idPtr) == lastId));
    } while (writingMine == FALSE);
```

TABLE 5

Process2 according to the present invention

```
/* controlPtr is a 16-byte aligned address; at that address there are:
 *      id - a unique number which is incremented after each data update.
 *      listPtr - the address of an array of address/data entries. */
Process2:
    idPtr = AddressOf(controlPtr->id);
    usePtr = AddressOf(controlPtr->listPtr);
    do {
        do {
            lastId = controlPtr->id;
            temp1 = account1->balance;
            temp2 = account2->balance;
            combinedBalance = temp1 + temp2;
            myEntry[0]->addr = NULL;
            results = SameCSwap(idPtr, lastId, usePtr, myEntry, NULL);
            /*
             *
             */
        } while (results.fail == FAIL);
```

TABLE 5-continued

Process2 according to the present invention

```
        writingMine = (results.old == NULL);
        entryPtr = ContentsOf(usePtr);
        i = 0;
        do {
            done = FALSE;
            while (FOREVER) {
                results = SameLoad8(idPtr, lastId, AddressOf(entryPtr[i]->addr));
                if (results.fail == FAIL) break;
                oldAddr = results.old;
                if (oldAddr == NULL) {
                    done = TRUE;
                    SameStore16(idPtr, lastId, usePtr, lastId+1, NULL);
                    break;
                }
                results = SameLoad8(idPtr, lastId, AddressOf(entryPtr[i]->data));
                if (results.fail == FAIL) break;
                oldData = results.old;
                results = SameStore8(idPtr, lastId, oldAddr, oldData);
                if (results.fail == FAIL) break;
                i = i + 1;
            }
        /* Check for false-sharing induced failures. These could occur when
         * the id/listPtr and account values are within the same cache line*/
        } while ((done == FALSE) && (ContentsOf(idPtr) == lastId));
    } while (writingMine == FALSE);
```

Having demonstrated an application of conditional locked update operations, details of several implementations of a set of conditional locked updates according to the present invention will be described. In all cases, the contents of a memory address is first compared for equality with a predetermined value. If they are equal, an update is performed.

In the examples to follow, it is assumed that the following nine update primitives are supported: COMPARE_SWAP_8, MASK_SWAP_8, FETCH_ADD_8, LESS_STORE_16, ZERO_STORE_16, COMPARE_FILL_16, WORD_LOAD_8, WORD_STORE_8 and PAIR_STORE_16. The functions performed by these updates are as follows.

COMPARE_SWAP_8, WORD_LOAD_8, WORD_STORE_8 AND PAIR_STORE_16 are the second memory-update parts of the SameCSwap8, SameLoad8, SameStore8 and SameStore16 operations discussed above, respectively. COMPARE_SWAP_8 takes a memory address register, a data register and a test register as arguments. If the value in the memory location addressed by the memory address register is equal to the value of the test register, the value in the data register is written to the memory address. The old content of the memory address is returned in a return register. WORD_LOAD_8 takes a memory address register as an argument. The value at the memory location addressed by the memory address register is loaded into a register. WORD_STORE_8 takes a memory address register and a data register as arguments. The value of the data register is written at the memory location addressed by the memory address register. PAIR_STORE_16 takes a memory address register and two data registers as arguments. The values of the data registers are written at two contiguous memory locations starting at the 16-byte-aligned address which includes the location addressed by the memory address register. MASK_SWAP_8 takes a memory address register, a data register and a mask register as arguments. The memory bits corresponding to zero bits of the mask register are left unchanged. The memory bits corresponding to the one bits of the mask register are set to the value of the corresponding bits of the data register. The old content of the memory address is returned in a return register. FETCH_ADD_8 takes a memory address register and a data register as arguments. The value of the data register is added to the data in the memory and the old value in the memory is returned. LESS_STORE_16 takes a memory address register, a first data register and a second data register as arguments. The value of the first data register is 2's complement subtracted from the value at the memory location addressed by the memory address register. If the difference, interpreted as a 2's complement signed value with the same precision as the registers and memory location, is less than zero, the instruction ends. Otherwise, the values of the first and second data registers are stored at two contiguous memory locations starting at the 16-byte-aligned address which includes the given memory address. ZERO_STORE_16 takes a memory address register, a first data register and a second data register as arguments. If the content of the memory address is not zero, the instruction ends. Otherwise, the first and second data values are stored at two contiguous memory locations starting at the 16-byte-aligned address which includes the given memory address. COMPARE_FILL_16 takes a memory address register, a test register and a data register as arguments. If the content of the memory address is not equal to the test register value, the instruction ends. Otherwise, value of the data register is stored at the lower of two contiguous memory locations starting at the 16-byte-aligned address including the given memory address, and the higher of these memory locations is set to zero.

Implementations preferably delay the fetching of cache line copies for the above instructions, as well as the conversion of the cache line from shared to owned or owned to exclusive state where required by cache coherence protocols, while the update conditions are false (resulting in a FAIL return status). This minimizes cache-line thrashing (alternating unnecessary invalidation and re-fetching), by eliminating unnecessary invalidations of unmodified cache-line copies.

The conditional lock operations could be implemented as a single processor instruction, but this is likely to complicate the design of most RISC processors, which normally access at most one address within each instruction. A preferred implementation would split the conditional lock operation into two instructions, one for testing the first address (for equality) and the second for performing the specified lock operation.

A variety of implementations are possible, from the most efficient that requires the most hardware support (called in the following discussion CPU_REDO) to the least expensive (called in the following discussion CPU_NONE). These implementations are discussed below.

The first implementation to be described, CPU_REDO, has the simplest user interface, but requires the most hardware support. When the address of the initial comparison is in the same cache line as the address of the final update, this is automatically detected and the first address comparison is repeated in the second instruction to eliminate sharing-induced failures. However, depending on the processor design, it may be hard to access two distinct offset addresses in the cache simultaneously. The application interface with the SameCSwap update, a particular case of the general Post2Lock instruction, as an example, is shown in Table 6. Within this table, as well as Tables 7A–11, each line of C code corresponds to a single processor instruction, and the symbol & means "address of".

TABLE 6

SameCSwap sequence, CPU_REDO start:
    Prep2Test8(address1, data1);
    Post2LockCSwap8(address2, next, test, &data, &fail);
done:
    /* other instructions */

Briefly, a Prep2Test8 instruction compares the value at memory address address1, held in a register reg[ra], with the content data1 of a register reg[rb]. If they are equal, a Post2Lock instruction updates the value held at address address2, held in a register reg[ra] (that may be specified within a field of the instruction to be different from the register specified to be reg[ra] in the Prep2Test8 instruction), using values next and test held in a register pair reg[rb], reg[rb+1] and returning the old memory value and a status code in a register pair reg[rc+0], reg[rc+1] corresponding to the data and fail variables.

Figure 4A:
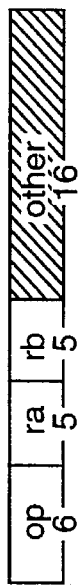
FIG. 4A is a diagram of the format of a Prep2Test instruction.

A possible instruction format (instruction representation in memory including several fields of contiguous bits) for the Prep2Test instruction (CPU_REDO) is shown in FIG. 4A. The instruction may be 32 bits long, with a 6-bit opcode (code identifying the instruction as a Prep2Test instruction) and two 5-bit fields identifying two of the processor's 64-bit registers, reg[ra] and reg[rb]. The remaining 16 bits may be used for other purposes.

Figure 4B:
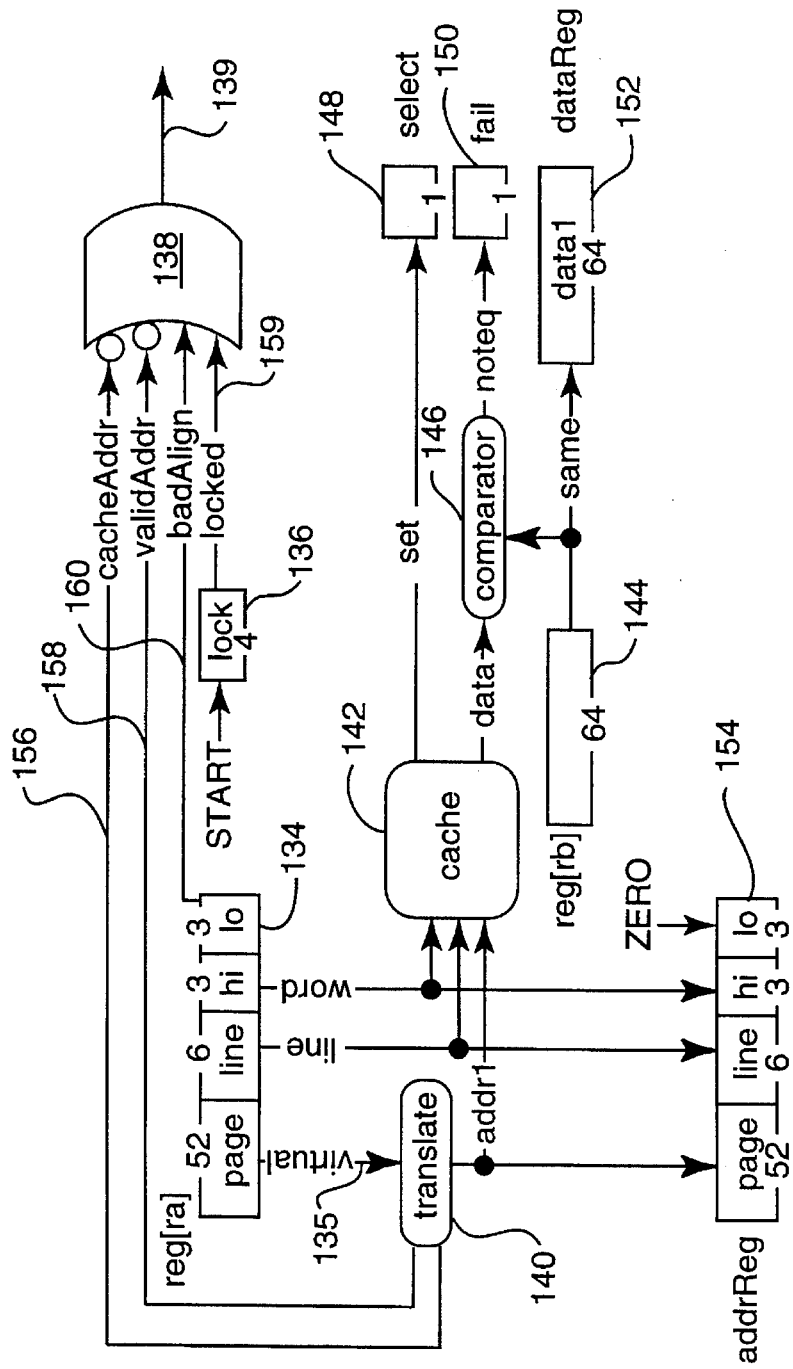
FIG. 4B is a block diagram of part of the hardware needed to execute the Prep2Test instruction.

FIG. 4B shows the hardware arrangement for executing the Prep2Test CPU_REDO instruction. A lock counter or register 136, which may have four bits, is set at the beginning of the instruction, and a trap is generated if the lock counter output was not initially zero. The trap is generated by locked input 159 to trap OR gate 138. Output 139 of OR gate 138 triggers a trap whenever one or both of inputs 156 cacheAddr and 158 validAddr are zero, or 159 locked or 160 badAlign are 1.

Lock counter 136 is set to zero on loads (readings of data from memory into a register), stores (writing of data from a register into memory) and taken branches (jumps to instructions that do not immediately follow the last instruction to be executed). On ALU operations (arithmetic and logic operations) and not-taken branches, lock counter 136 is decremented if not zero and kept at zero if zero. Interrupts but not traps are disabled when the lock counter is not zero. For the Prep2Test8 instruction, the START value, at which the lock counter is set, is 1.

The contents of reg[ra] 134 specified by the instruction is interpreted as a virtual address (address specified by the processor that may not correspond to an address in physical memory), corresponding to address1 in Table 6. The virtual page address 135 is translated by virtual memory subsystem 140 into a physical page address addr1. Only the 52 most-significant bits, specifying a virtual address page, need to be translated into a physical memory page position. The 12 least-significant bits, six of which specify the cache line position in the page and six of which specify the word position in the cache line, are the same for both the virtual and the physical address. Correct alignment, which must be provided by the software, requires that the three least-significant bits be zero. Signals 156 cacheAddr, 158 validAddr and 160 badAlign are used to generate a trap if the address is not valid or not cacheable as determined by translate subsystem 140, or if the address alignment is incorrect (the three least-significant bits are not zero), respectively. All but the three least-significant bits of the physical address are saved in special purpose register addrReg 154 (the three least-significant bits should be zero). The physical address is presented to cache 142. If the address is not in the cache, the processor stalls (not shown) until the data (and, as discussed, its address) is fetched into the cache 142. When the data becomes available, its cache associativity set, which indicates which of two sets of cache lines contains the cache line of the physical address presented to the cache, is saved into a 1-bit select register 148 and the data is presented to comparator 146. It should be noted that instead of stalling, the processor may context switch while waiting for the data to be fetched into the cache memory 142, as will be later described. Comparator 146 compares the data in the cache with the contents of register reg[rb] 144 corresponding to data2 in Table 6, which is also saved into special purpose 64-bit register dataReg 152. If the two values are not equal, the bit in the fail register 150 is set.

All the above-discussed trap signals 156, 158, 159 and 160 are combined by OR gate 138. Not shown is the hardware for processing' the trap signal output by OR gate 138. This signal is assumed to abort the instruction and inhibits storage updates. Depending on the implementation, the values of the inputs to OR gate 138, or an encoded version of them, may be saved for use by the trap-handling software.

Special processing of Prep2Test8 address-translation traps (traps generated by the virtual memory subsystem 140 when the page to be accessed is not in the physical memory as previously discussed) is required to support the Post2Lock lock operation semantics. If the address-translation trap is generated by a bad (not permitted) Prep2Test8 address (as opposed to an unloaded page-table entry), the trap handler emulates the following Post2Lock instruction by generating a distinct bad-status code and returning control to the instruction following the Post2Lock instruction.

Figure 5A:
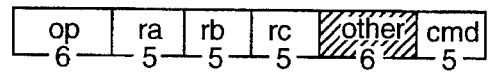
FIG. 5A is a diagram of the format of a Post2Lock instruction.
Figure 5B:
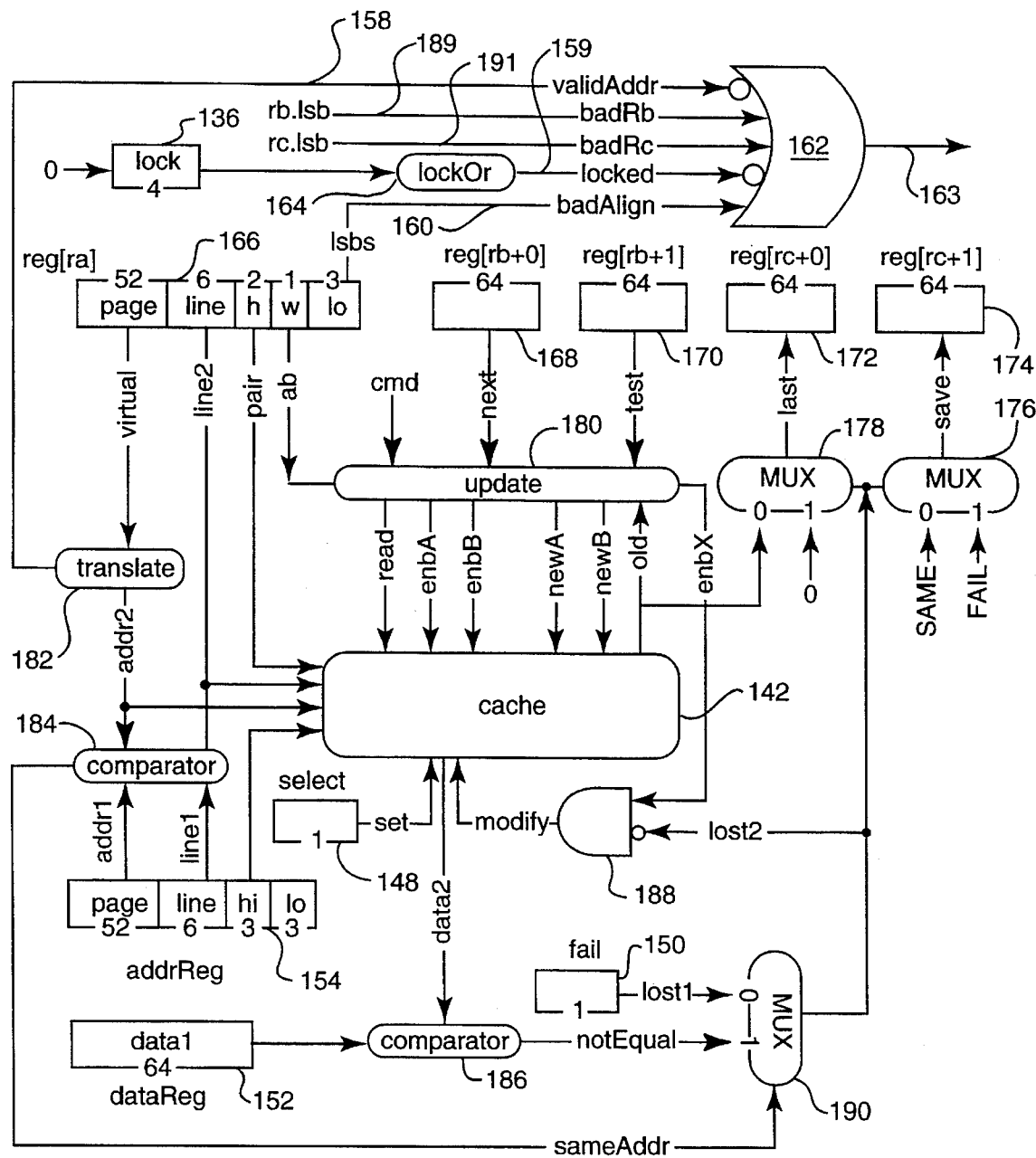
FIG. 5B is a block diagram of part of the hardware needed to execute the Post2Lock instruction.

A possible instruction format for the Post2Lock CPU_REDO instruction, of which Post2LockCSwap8 is a special case, is shown in FIG. 5A. The instruction may be 32 bits long, with a 6-bit opcode and three 5-bit fields identifying one register and two register pairs reg[ra], reg[rb+0], reg[rb+1], reg[rc+0] and reg[rc+1]. A 5-bit field cmd specifies the update to be performed. The remaining 6 bits may be used for other purposes. A trap is generated by OR gate 162 with output 163 if the rb and rc register pair specifiers are not both even, using signals 189 badRb and 191 badRc (FIG. 5B).

Register reg[ra] 166 contains a virtual address to be accessed. The virtual page address is translated by virtual memory subsystem 182 to a physical page address addr2 which is presented to cache 142 and comparator 184, which compares it to the physical address addr1 stored in register addrReg 154. Comparator 184 also compares the reg[ra] line address line2 with addrReg line address line1. The output of comparator 184 determines, via multiplexer 190, whether the fail bit or register 150 or the comparator 186 is used to determine whether the first comparison was successful. If line1 and line2 are different cache lines, the compare-result from the previous Prep2Test instruction, held in fail bit or register 150, can be used. This eliminates the need to check two distinct cache lines within a single instruction. If the line1-specified cache line has been invalidated (possibly due to a store within this cache line), the fail bit or register 150 is set and, if the addresses of reg[ra] and addrReg are in different cache lines, a FAIL status is returned.

If the addresses of reg[ra] and addrReg are in the same cache line, both data-value comparisons are performed concurrently. Concurrent comparisons are needed because the conversion of the cache line from a shared state to an owned state (which is sometimes necessary for the execution of the Post2Lock instruction) can temporarily invalidate the cache line, which sets fail bit or register 150 to 1. Comparator 186 compares the data saved in register dataReg 152 with the data at the address saved in register addrReg 154. Registers reg[rb+0]168 and reg[rb+1] 170 contain data to be used by update circuit 180 to perform the instruction. Register reg [rc+0] 172 is set by multiplexer 178 to zero or to the old data provided by the cache 142 depending on the output of multiplexer 190. Register reg[rc+1] 174 is set by multiplexer 176 to a SAME or FAIL code depending on the output of multiplexer 190. The lock register updates for the Post2LockStore8 and Post2LockStore16 are slightly different, in that the reg[rc+0] register 172 is set to zero because the old data value is not returned by these instructions. This is accomplished by setting read output of update logic 180 to zero, which causes the cache output old to be zero instead of the value at the address of reg[ra].

Or gate 162 triggers a trap if the rb and rc registers are incorrectly aligned as discussed above, if lock counter 136 is initially zero (as indicated by the output of lockOr gate 137), or if the address in register reg[ra] is incorrectly aligned or invalid. To ensure forward progress, the trap handler is expected to load page-translation tables with the entries for addr1 and addr2 addresses before resuming execution at the initial Prep2Test8 instruction, requiring a three-way associative shared instruction-data TLB or a split instruction TLB with a two-way data TLB. A two- or three-way associative TLB has two or three associativity sets allowing loading two or three pages without the possibility of replacing one of these page translation entries with another one of these page translation entries.

Update logic 180 has inputs ab, cmd, next, test, and old, and outputs enbA, newA, newB, enbB and enbX and read. When relevant, signal ab specifies which one of a pair of memory words is to be updated. Signal cmd specifies which update command is being executed and is derived by decoding the op field contained within the Post2Lock instruction being executed. Signal next is the content of register reg [rb+0] 168. Signal test is the content of register reg[rb+1] 170. Signal old is the value of the memory location specified by the address in reg[ra] when signal read is 1, and 0 when signal read is 0. Signal read is zero when cmd is WORD_STORE_8 or PAIR_STORE_8, and 1 in all other cases. Signal newA is a value to be assigned, if enabled by signal enbA, to the lower of a pair of addresses specified by the address in reg[ra]. Signal newB is a value to be assigned, if enabled by signal enbB, to the larger of a pair of addresses specified by the address in reg[ra]. Signal enbX may be used to disable all memory updates. If the cache line is not owned and the modify signal is 1, the line is converted into an owned state. Once owned, the current modify signal (which may have changed) affects the data updates and invalidates other copies of the cache line in other caches, converting the line from owned to exclusive. If the cache line is invalid and is fetched from memory, the cache uses the value of select register 148 to place the fetched cache line into a different associativity set from the cache line previously tested, to avoid rolling the cache line previously tested out of the cache, i.e. replacing it with the new line.

OR gate 164 has all the bits of lock counter 136 as inputs and triggers a trap if all the bits are initially zero. At the end of the instruction, the lock counter is reset (set to zero) to reenable interrupts. AND gate 188 is used to enable and disable writing to cache 142.

The structure of update logic 180 is shown in FIGS. 6A–6D. Update logic 180 includes three comparators 194, 196 and 198, an adder 200, two multiplexers 204 and 206, decode logic 192 and merge logic 202. Update logic 180 has inputs cmd, ab, next, test, and old, and outputs enbA, enbB, enbX, newA, newB and read. Comparator 194 has signals test and old as inputs, and its output signal, called eq, indicates whether the inputs are equal and is an input to decode logic 192. Comparator 196 has signals next and old as inputs, and its output signal, called lt, indicates whether the two's complement difference of the inputs (old—next), interpreted as a signed integer with the same precision as the inputs, is negative. Lt is an input to decode logic 192. Comparator 198 has signals old and a zero word as inputs and its output signal, called ez, indicates whether the inputs are equal and is an input to decode logic 192. Adder 200 has signals next and old as inputs, and its output is an input to multiplexer 204. Multiplexer 204 multiplexes signal next and the outputs of adder 200 and merge logic 202 described below, with input mA from decode logic 192 used to select one of the other signals. Its output is one of the inputs to multiplexer 206, which also has signal test and a zero word as inputs, with input mB from decode logic 192 used to select one of the other signals. The outputs of multiplexers 204 and 206 are sets of signals newA and newB, respectively.

Figures 6A, 6B:
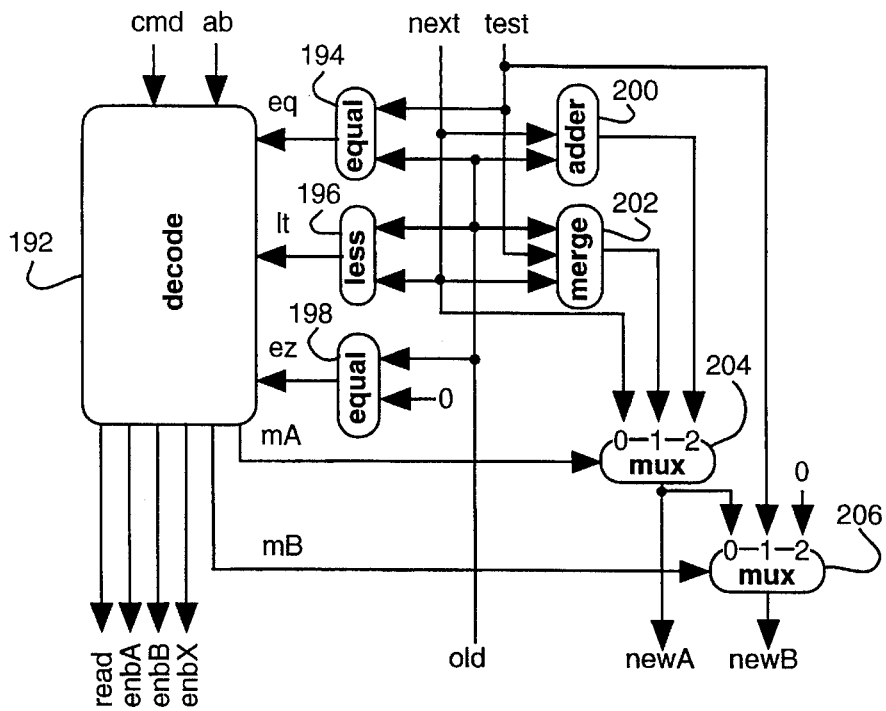
FIGS. 6A, C and D are block diagrams showing details of the update logic of FIGS. 5B, 8B and 14.
FIG. 6B is a truth table of the decode logic of FIG. 6A.

Decode logic 192 has inputs cmd, ab, eq, it and ez, and outputs enbA, enbB, enbX, mA, mB and read. FIG. 6B is a truth table for decode logic 192, where the letter x has been used for values that do not affect the operation of the processor and may therefore be arbitrary.

Figure 6C:
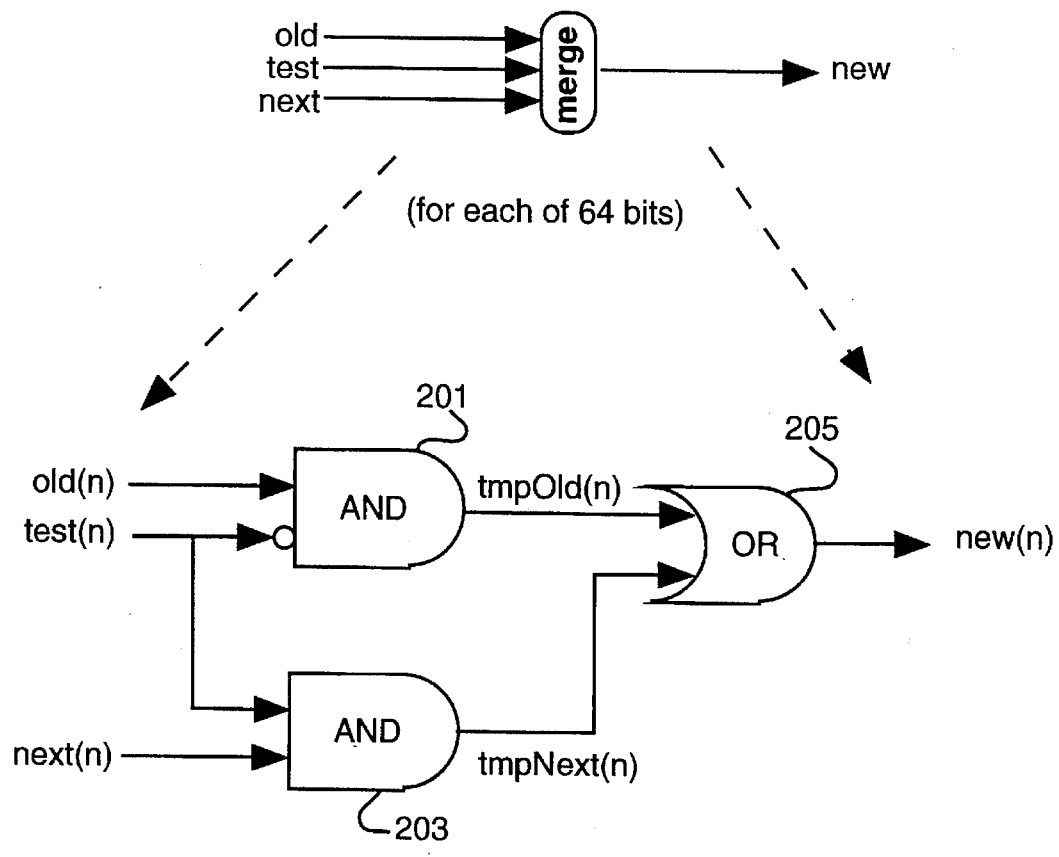
Figure 6D:
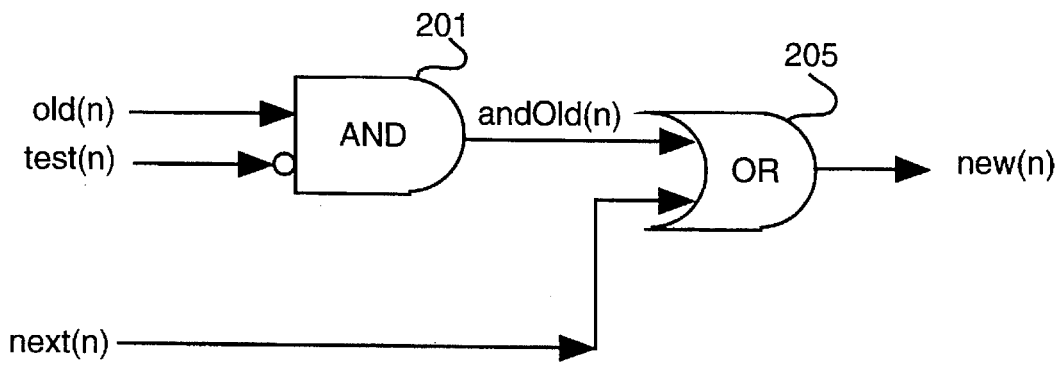

FIGS. 6C and 6D are alternate embodiments of one of 64 bit slices of merge logic 202. The embodiment of FIG. 6C comprises two AND gates 201 with inputs old{n} and the complement of test{n} and output tmpOld{n} and 203 with inputs test{n} and next{n} and output tmpNext{n} and OR gate 205, which has inputs tmpOld{n} and tmpNext{n} and outputs a bit new{n} of either the signal old or the signal next, depending on the value of the corresponding bit of signal test. The embodiment of FIG. 6D is less expensive, requiring only one AND gate 201 and one OR gate 205, but requires the value of the signal next to be previously calculated by the processor by performing the operation next=next AND test.

The CPU_REDO implementation, which provides instructions Prep2Test8 and Post2Lock, has been described.

This implementation may simultaneously compare two cache-line offsets.

The need to simultaneously compare two cache-line offsets can complicate the design of the RISC processors that do not otherwise have this capability. As an alternative CPU_BOTH implementation, a PrepTest8 instruction can be programmed to lock the first cache line until a second PostLock instruction is reached. For example, Tables 7A and 7B illustrate this based on a 2-instruction extended-lock operation sequence.

TABLE 7A

Most efficient SameCSwap sequence, CPU_BOTH

```
/* SameCSwap8 equivalent instructions */
    owned = !OWNED
loop:
    PrepTest8(address1, data1, owned);
    PostLockCSwap8(address2, next, test, &data, &fail);
    if (fail != FAIL) goto done;
    if (owned == OWNED) goto done;
    if (!SameLine(address1, address2)) goto done;
    owned = OWNED;
    goto loop;
done:
    /* other instructions */
```

TABLE 7B

Simpler SameCSwap sequence, CPU_BOTH

```
/* Simpler less efficient SameCSwap equivalent instructions */
PrepTest8(address1, data1, OWNED);
PostLockCSwap8(address2, next, test, &data, &fail);
/* Other instructions */
```

Briefly, a PrepTest8 instruction compares the value at memory address address1, held in a register reg[ra], with the content data1 of a register reg[rb]. If they are equal, a PostLock instruction updates the value held at address address2, held in a register reg[ra] (that may be specified to be different from the register specified to be reg[ra] in the PrepTest8 instruction depending on the value of the field indicating reg[ra]), using values next and test held in a register pair reg[rb], reg[rb+1] and returning the old memory value and a status code in a register pair reg[rc+0], reg[rc+1] corresponding to variables data and fail in Tables 7A and 7B.

As shown in FIG. 7A, the PrepTest8 CPU_BOTH instruction contains ra and rb fields. The instruction may be 32 bits long, with a 6-bit opcode and two 5-bit fields identifying one register and one register pair reg[ra], reg[rb+0], and reg[rb+1]. The remaining 16 bits may be used for other purposes. The ra field identifies the register 134 (FIG. 7B) and the rb field identifies two rb+0 144 and rb+1210 registers. As shown in FIG. 7B, reg[rb+0] 144 contains the value of data1, and the least-significant bit of reg[rb+1] 210 indicates whether the comparison shall be performed on an owned line. If the comparison is to be performed on an owned line, a hold bit or register 208 is set using an owned signal to ensure that the cache line or reg[ra] is locked (preventing loss of cache line ownership) until the next PostLock8 instruction is reached or lock counter 136 is set to zero.

A lock counter or register 136 is set, and a trap is generated if the lock counter output was not initially zero. The trap is generated by locked input 159 to trap OR gate 138 whose output 139 triggers a trap whenever one or both of inputs 156 cacheAddr and 158 validAddr is zero or if input 159 locked or 160 badAlign is 1.

Lock counter 136 is set to zero on loads, stores and taken branches. On ALU operations and not-taken branches, lock counter 136 is decremented if not zero and kept at zero if zero. Interrupts are disabled when the lock counter is not zero. For the PrepTest8 instruction, the START value, to which lock counter 136 is set, is 1.

The contents of reg[ra] 134 specified by the instruction is interpreted as a virtual address and its virtual page address is translated by virtual memory subsystem 140 into a physical page address addr1. Signals 156, 158 and 160 are used to generate a trap if the address is not valid, not cacheable, or if the address alignment is incorrect (the three least-significant bits are not zero). The physical address, given by signals addr1, line, and word, is presented to cache 142 and, with the exception of the three least-significant bits which should be zero, stored in special purpose register addrReg. If the address is not in the cache, the processor stalls until the data is fetched into the cache. When the data becomes available, its cache associativity-set, which indicates a set of cache lines which contains the cache line of the physical address presented to the cache, is saved into select register 148 and the data is presented to comparator 146. It should be noted that instead of stalling, the processor may context switch while waiting for the data to be fetched from the memory, as will be later described. Comparator 146 compares the data in the cache with the contents of register reg[rb+0]. If the two values are not equal, fail bit or register 150 is set.

All the above-discussed trap signals 156, 158, 159 and 160 are combined by OR gate 138. Not shown is the hardware for processing the trap signal 139 output by OR gate 138. This signal is assumed to abort the instruction and inhibits storage updates. Depending on the implementation, the values of the inputs to OR gate 138 or an encoded version of them, may be saved for use by the trap-handling software.

Special processing of PrepTest8 address-translation traps is required to support the PostLock lock operation semantics. If the address-translation trap is generated by a bad PrepTest8 address (as opposed to an unloaded page-table entry), the trap handler emulates the following PostLock instruction, generating a distinct bad-status code, and returns control to the instruction following the PostLock instruction.

The instruction format of the PostLock instruction shown in FIG. 8A, of which PostLockCSwap8 is a special case, is similar to that described above for the Post2Lock instruction. The instruction may be 32 bits long, with a 6-bit opcode and three 5-bit fields identifying one register and two register pairs reg[ra], reg[rb+0], reg[rb+1], reg[rc+0] and reg[rc+1]. A 5-bit field cmd specifies the update to be performed. The remaining 6 bits may be used for other purposes. A trap is generated by OR gate 162 with output 163 if the rb and rc register pair specifiers are not both even, using signals 189 badRb and 191 badRc (FIG. 8B).

The hardware used by the PostLock instruction, shown in FIG. 8B, is a subset of the hardware used by the Post2Lock instruction. The capability of recomparing the data at addr1 is eliminated. PostLock address translation traps are handled as described for the Post2Lock instruction. At the end of the PostLock instruction, hold bit or register 208 is reset.

Register reg[ra]166 contains a virtual address to be accessed. The virtual page address is translated by virtual memory subsystem 182 to a physical page address addr2 which is presented to cache 142. Registers reg[rb+0] 168 and reg[rb+1] 170 contain data to be used by update circuit 180, described above, to perform the instruction. Register reg[rc+0] 172 is set by multiplexer 178 to zero or to the old data provided by cache 142 depending on the value of fail bit or register 150. This value also determines, via multiplexer 176, whether register reg[rc+1]174 is set to SAME or to FAIL. The lock register updates for the PostLockStore8 and PostLockStore16 are slightly different, in that the reg [rc+0] register 172 is set to zero because the old data value is not returned by these instructions. As before, this is accomplished by setting read output of update logic 180 to zero, which causes the cache output old to be zero instead to the value at the address in reg[ra].

Or gate 162 triggers a trap if the rb and rc registers are incorrectly aligned as discussed above, if lock counter 136 is initially zero (as indicated by the output of lockOr gate 137), or if the address in register reg[ra] is incorrectly aligned or invalid. To ensure forward progress, the trap handler is expected to load page-translation tables with the entries for addr1 and addr2 addresses before resuming execution at the initial PrepTest8 instruction, requiring a three-way associative shared instruction-data TLB or a split instruction TLB with a two-way data TLB.

Update logic 180 was described above in the discussion of the CPU_REDO implementation.

If the cache line is not owned and the modify signal is 1, the line is converted into an owned state. Once owned, the current modify signal (which may have changed) affects the data updates and invalidates other copies of the cache line in other caches, converting the line from owned to exclusive. If the cache line is invalid and fetched from memory, the cache uses the value of select register 148 to place the fetched cache line into a different associativity set from the cache line previously tested, to avoid rolling the cache line previously tested out of the cache.

At the end of the instruction, the lock counter 136 is reset to reenable interrupts. AND gate 188 is used to enable and disable writing to cache 142.

The CPU_BOTH implementation, which provides instructions PrepTest8 and PostLock, has been described. This implementation tests a data value as it is loaded.

The need to test a data value as it is loaded can complicate the design of the RISC processors that do not otherwise have that capability. Within such implementations, it may be appropriate to use a PrepLoad instruction to load the first data value and to use other processor instructions to perform the first-address comparison, as illustrated in Tables 8; A and 8B. This implementation is called CPU_POST.

TABLE 8A

```
SameCSwap sequence, CPU_POST.
    /* SameCSwap8 equivalent instructions */
    owned = !OWNED
loop:
    PrepLoad8(address1, data1, owned, &first); /* data1 not
    used */
    if (first != data1) goto fail;
    PostLockCSwapS(address2, next, test, &data, &fail);
    if (fail != FAIL) goto done;
    if (owned == OWNED) goto done;
    if (!SameLine(address1, address2)) goto done;
    owned = OWNED;
    goto loop;
35 fail:
    fail = FAIL;
done:
    /* Other instructions *
```

TABLE 8B

```
Simpler SameCSwap sequence, CPU_POST.
    /* Simpler, less efficient version of SameCSwap sequence */
    PrepLoad8(address1, data1, OWNED, &first);
    if (first != data1) goto diff;
    PostLockCSwap8(address2, next, test, &data, &fail);
    goto done;
diff:
    fail = DIFF;
done:
    /* Other instructions */
```

Briefly, a PrepLoad8 instruction loads the value at the address1 content of register reg[ra] into register reg[rc]. The ownership of the cache line is given by the least-significant bit of register reg[rb+1]. If later executed, a PostLock instruction behaves as described earlier. It updates the value held at address address2, held in a register reg[ra] (that may be specified to be different from the register specified to be reg[ra] in the PrepTest8 instruction, using values next and test held in a register pair reg[rb], reg[rb+1] and returning the old memory value and a status code in a register pair reg[rc+0], reg[rc+1].

Figures 9A, 9B:
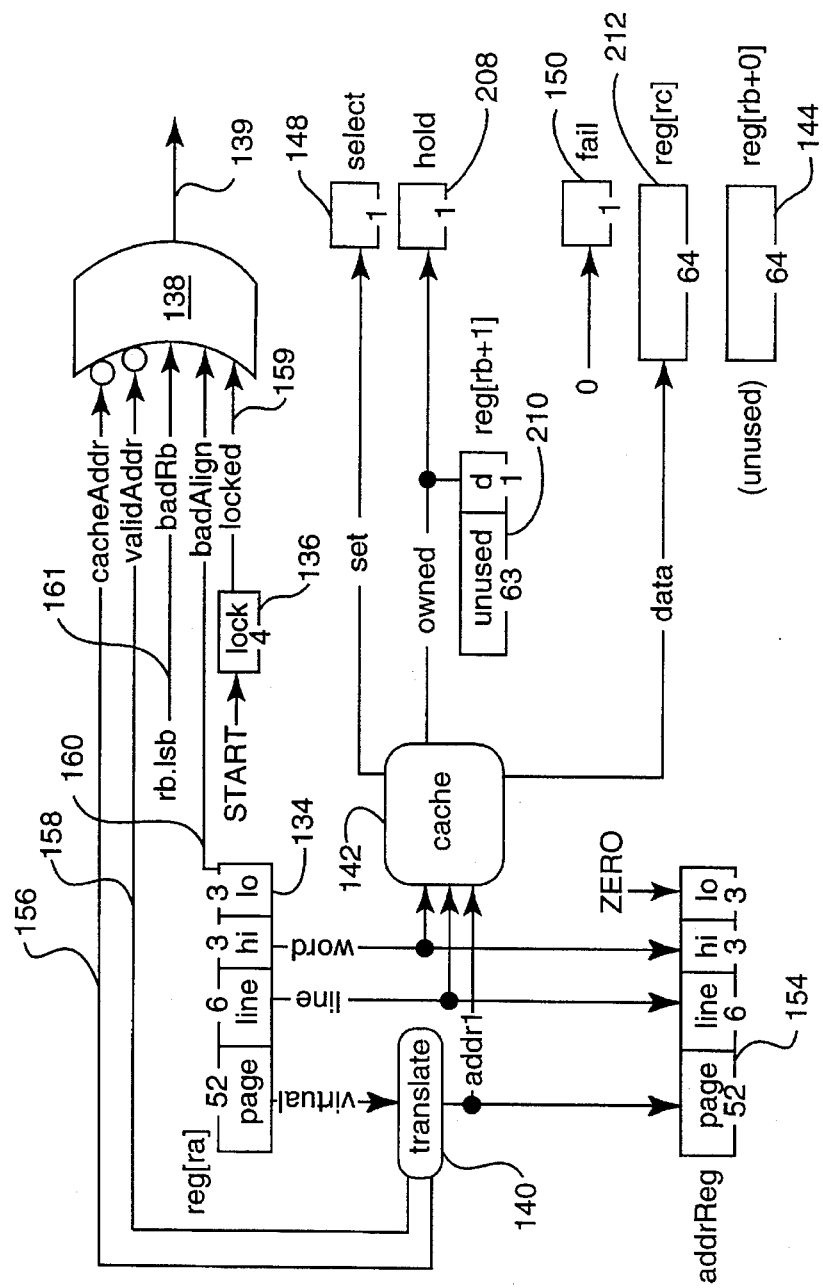
FIG. 9A is a diagram of the format of a PrepLoad8 instruction.
FIG. 9B is a block diagram of part of the hardware needed to execute the PrepLoad8 instruction.

As shown in FIG. 9A, the PrepLoad8 CPU_POST instruction, which may be 32 bits long, contains ra, rb and rc 5;-bit fields. The ra field identifies register 134 (FIG. 9B), the rb field identifies two rb+0and rb+1 registers, and the rc field identifies the register into which the data at the address in reg[ra] is loaded.

A lock counter or register 136 is set, and a trap is generated if the lock counter output was not initially zero. The trap is generated by the locked input 159 to trap OR gate 138, whose output 139 triggers a trap whenever one or both of inputs 156 cacheAddr and 158 validAddr is zero or if one or more of inputs 159 locked, 160 badAlign or 161 badRb are 1.

Lock counter 136 is set to zero on loads, stores and taken branches. On ALU operations and not-taken branches, lock counter 136 is decremented if not zero and kept at zero if zero. Interrupts are disabled when the lock counter is not zero. For the PrepLoad8 instruction, the START value, to which lock counter 136 is set, must be 2 or larger, depending on the number of processor instructions required to perform the intermediate data-value comparisons.

The contents of reg[ra] 134 specified by the instruction is interpreted as a virtual address and the virtual page address is translated by virtual memory subsystem 140 into a physical page address addr1. Signals 156, 158, 160 and 161 are used to generate a trap if the address is not valid, not cacheable, if the address alignment is incorrect, or if the rb register specifier is not even. All but the three least-significant bits of the physical address is saved in special purpose register addrReg 154 and presented to cache 142. If the address is not in the cache, the processor stalls until the data is fetched into the cache. When the data becomes available, its cache associativity-set, which indicates a set of cache lines which contains the cache line of the physical address presented to the cache, is saved into select register 148. The data itself is saved in reg[rc] 212. It should be noted that instead of stalling, the processor may context switch while waiting for the data to be fetched into the memory, as will be later described. As shown in FIG. 9B, reg[rb+0] 144 contains the value of data1, which is not used in this processor-stall version of the PrepLoad8 instruction, but is provided for use within the context-switch version of the PrepLoad8 instruction. The least-significant bit of reg[rb+1] 210 indicates whether the comparison shall be performed on an owned line. If so, the cache line at the address in reg[ra] is locked (preventing loss of cache line ownership) until the next PostLock8 instruction, which was described above, is reached, by setting a hold bit or register 208 which is set to zero when lock counter 136 is set to zero. Fail bit or register 150 is set to zero.

All the above-discussed trap signals are combined by OR gate 138. Not shown is the hardware for processing the trap signal output by OR gate 138. This signal is assumed to abort the instruction and inhibits storage updates. Depending on the implementation, the values of the inputs to OR gate 138 or an encoded version of them, may be saved for use by the trap-handling software.

Special processing of PrepLoad8 address-translation traps is required to support the PostLock lock operation semantics. If the address-translation trap is generated by a bad PrepLoad8 address (as opposed to an unloaded page-table entry), the trap handler emulates the following PostLock instruction, generating a distinct bad-status code, and returns control to the following instruction.

Register reg[rc] 212 is used to save the data read from cache 142. As shown in Tables 8A and 8B, the comparison for equality is done subsequently by the software, while lock counter 136 is not zero and interrupts are disabled. Following this, a PostLock instruction is executed as was described in the CPU_BOTH implementation.

The CPU_POST implementation, which provides instructions PrepLoad8 and PostLock, has been described. This implementation performs direct computation of lock-update values during the PostLock instruction, using update logic 180.

Since RISC processors may not support direct computation of lock-update values, other instructions can be used to compute these values. To make this simplified CPU_NONE implementation possible, it is necessary to provide, in addition to previously described PrepLoad8 instruction, the following three instructions: NextLock, PostStore8 and PostStore16. NextLock reads and locks the second address. The PostStore instructions update the second address.

For example, Tables 9A and 9B illustrate such a conditional-lock-operation sequence, and Table 10 gives source code fragments for use within CPU NONE applications that are update-specific.

Briefly, a PrepLoad8 instruction behaves as described above. It loads the value at the address1 content of register reg[ra] into register reg[rc]. The ownership of the cache line is given by the least-significant bit of register reg[rb+1]. If later executed, a NextLock instruction loads the value at address2 held in register reg[ra] into register reg[rc+0] if address2 is cacheable, or transfers the content of registers reg[ra], reg[rb+0], reg[rb+1] together with a specifier of the update to be performed, to the bus interface, if address2 is not cacheable. In either case, the old value at address2 is returned in register reg[rc+0] and a status code is returned in register reg[rc+1]. If later executed, a PostStore instruction stores a value held in reg[rb] or the pair reg[rb+0], reg[rb+1] into the memory address or pair of addresses including address2 held in reg[ra]. A status code is returned in reg[rc].

Figure 10A:
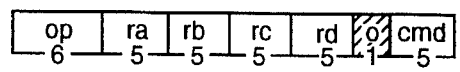
FIG. 10A is a diagram of the format of a NextLock instruction.
Figure 10B:
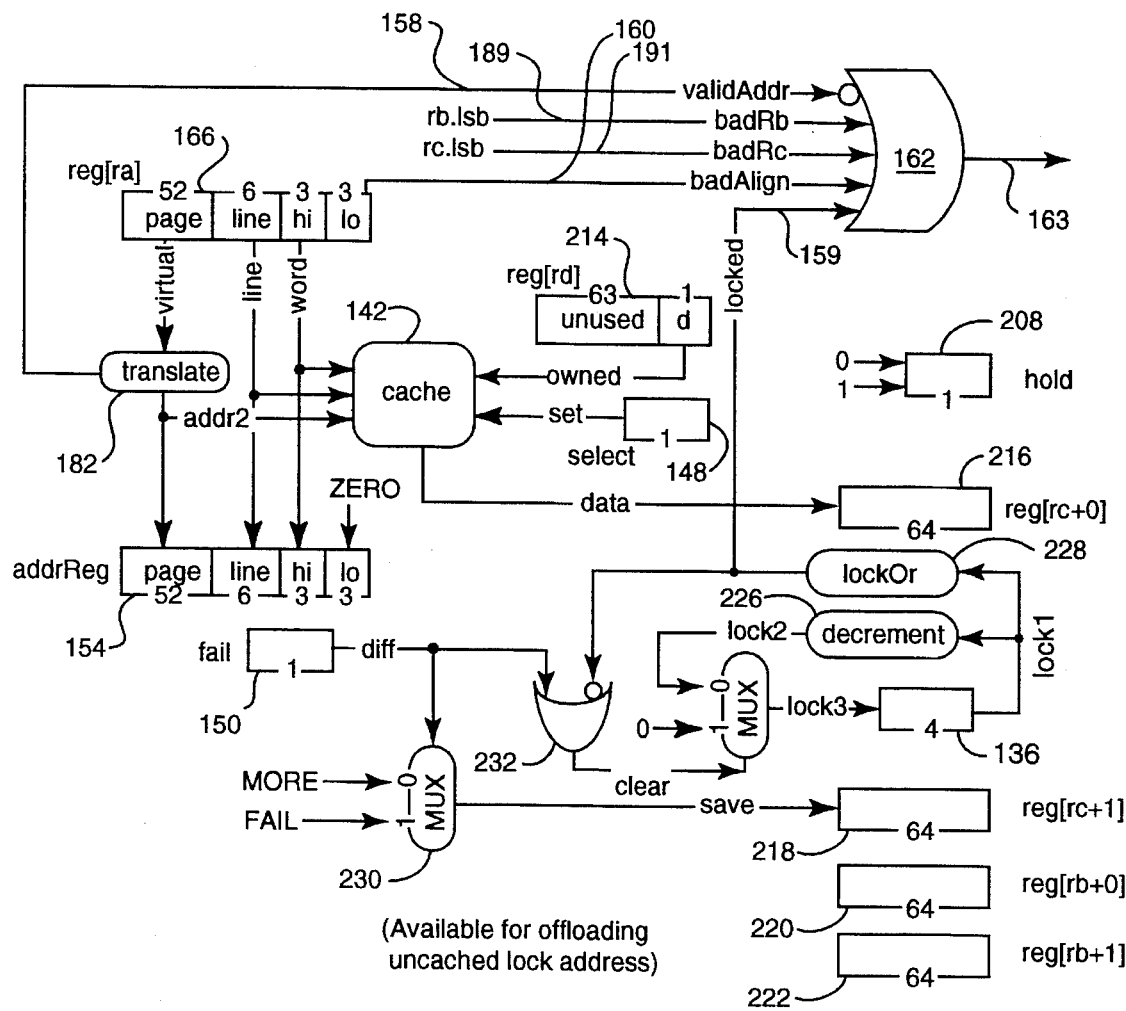
FIG. 10B is a block diagram of part of the hardware needed to execute the NextLock instruction.

As shown in FIGS. 10A–B, the NextLock instruction, of which NextLockCSwap8 is a special case, may be 32 bits long and have a 6-bit opcode, a 5-bit field cmd for specifying a memory update command, and four 5-bit fields identifying two registers ra (166, FIG. 10B) and rd 214, and two register pairs rb+0 220, rb+1 222, rc+0 216 and rc+1 218. For cacheable addresses, the instruction ensures that the memory address specified in register reg[ra] 166 is cached in cache 142 using select register 148 to place the line, if it is fetched, into a different associativity set than the one used in the immediately prior PrepLoad instruction. The least-significant bit of register reg[rd] 214 specifies whether the cache line should be owned.

A trap is generated by OR gate 162 with output 163 if the rb and rc register pair specifiers are not both even (as indicated by signals badRb 189 and badRc 191). A trap is also generated if lock counter 136 is initially zero (as indicated by the output 159 of lockOr gate 228), or if the address in register reg[ra] is incorrectly aligned (as indicated by signal badAlign 160) or invalid as indicated by complemented signal validAddr 158.

Register reg[ra] 166 contains a virtual address to be accessed. The virtual page address is translated by virtual memory subsystem 182 to a physical page address addr2. All but the three least-significant bits of the full physical address are stored in register addrReg 154 and presented to cache 142.

Figure 10C:
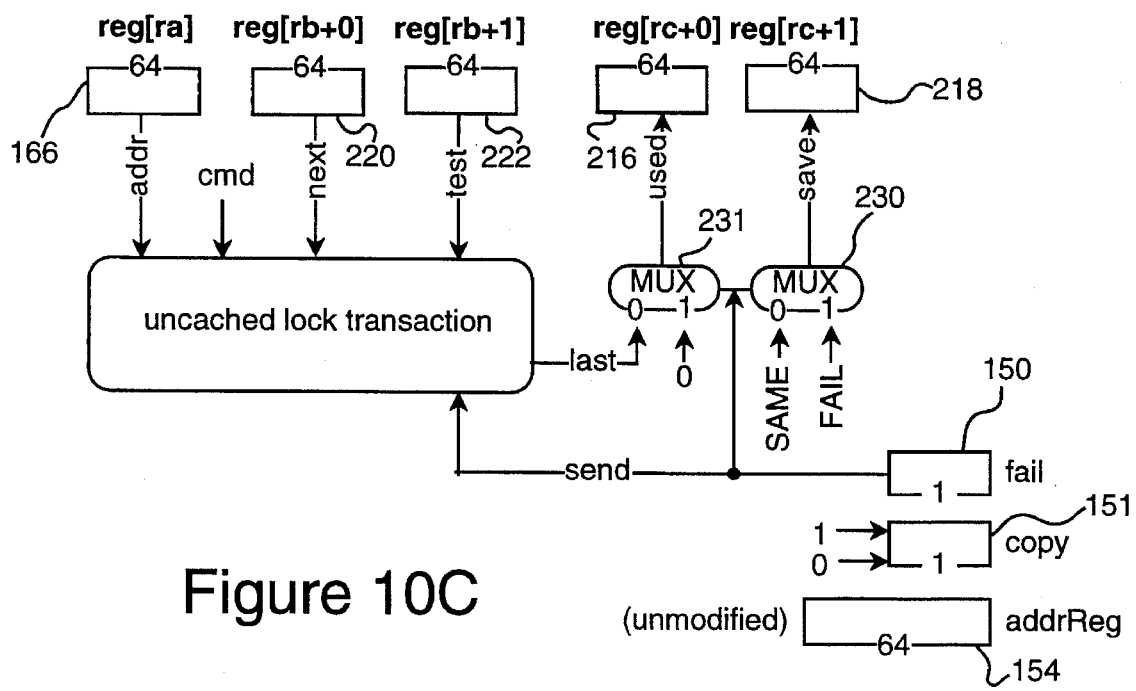
FIG. 10C is a block diagram of part of the hardware needed to process an uncached conditional-lock address.

If the address is not cacheable, the instruction and the data in the registers reg[ra] 166, reg[rb+0] 220, reg[rb+1] 222, and reg[rc+1] 218 are sent to be executed by the bus interface which performs the update operation, as shown in FIG. 10C. However, if the fail bit or register 150 has been set, an uncached lock transaction is not generated, and register reg[rc+0] 216 is set to zero by multiplexer 231, while register reg[rc+1] 218 is set to FAIL by multiplexer 230. Otherwise, a copy bit or register 151 is set to inhibit an invalidation of the addrReg 154 -specified cache-line address (exclusive use is not required), an uncached lock transaction is generated and completed, and copy 151 is restored to 0, to allow further cache-line updates. Reg[rc+1] is set to SAME. Deadlock is not a problem, since the uncached lock transaction has no coherence dependencies. This arrangement can also be used with the CPU_REDO, CPU_BOTH and CPU_POST implementations, but (in all cases) can be used only for the update and not also for the initial compare, which must use a coherent address.

If the address is cacheable but the desired cache line is not cached in the desired ownership state, the hold bit or register 208 is cleared and the cache line is fetched or converted to the proper state. Until the addressed cache line is available, an invalidation of the addrReg address (which was set by the previous PrepLoad instruction) sets the fail bit or register to 1. Once the addressed cache line is available, the hold bit or register 208 is set to 1 (which inhibits changes in ownership) and the addrReg physical address value is updated using the reg[ra] virtual address value. Hold bit or register 208 is cleared when lock counter 136 is set to zero.

Lock counter 136 is updated by a combination of OR gates 232 and 228, decrement logic 226 and multiplexer 224. The counter is decremented if greater than zero unless the fail bit or register 150 is one, in which case counter 136 is cleared. The status of the fail bit or register 150 is saved, using multiplexer 230, in register reg[rc+1] 218 as FAIL if the fail bit or register was 1, or as MORE (signifying that the lock operation has not been executed by the bus interface and should be executed by subsequent instructions) otherwise.

Figure 11A:
FIG. 11A is a diagram of the format of a PostStore8 instruction.
Figure 11B:
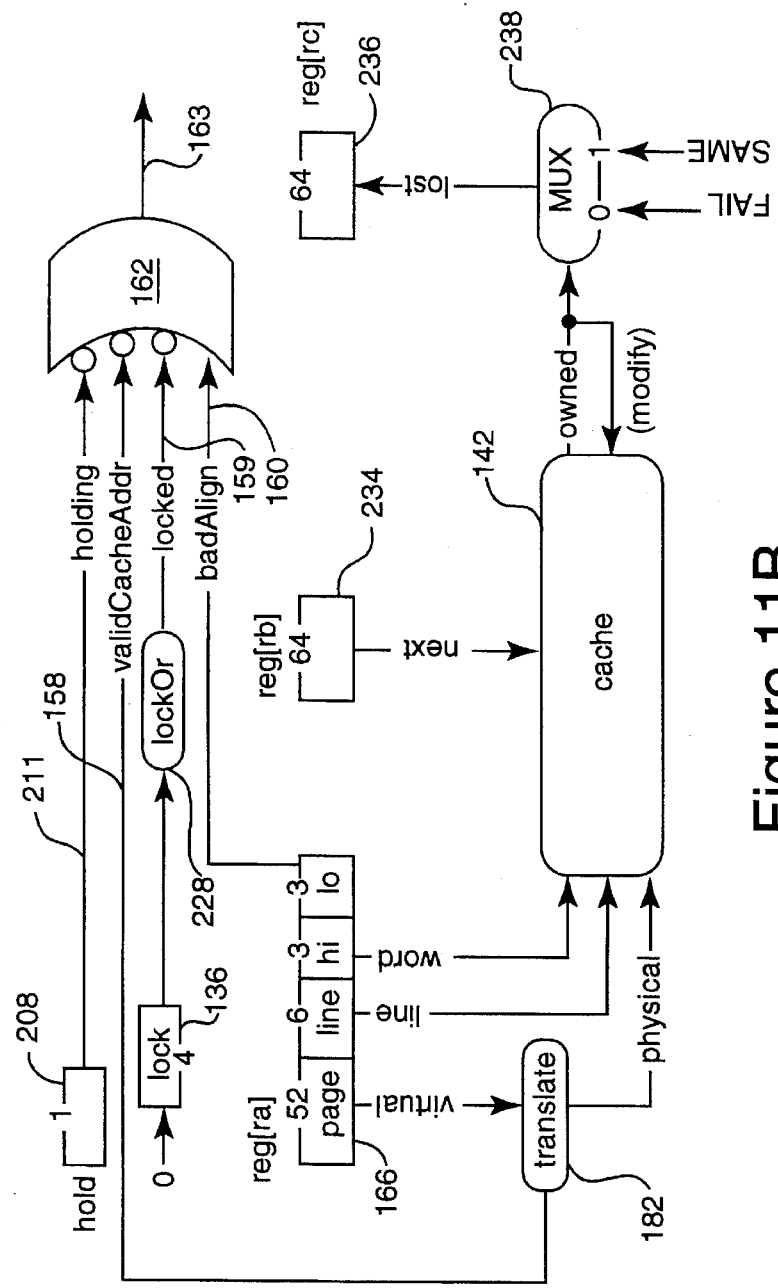
Figure 11B is a block diagram of part of the hardware needed to execute the PostStore8 instruction.

As shown in FIGS. 11A–B, the PostStore8 instruction may be 32 bit long, with a 6-bit opcode and three 5-bit fields identifying three registers reg[ra] 166, reg[rb] 234 and reg[rc] 236. The remaining 11 bits may be used for other purposes. A trap is generated by OR gate 162 with output 163 if lock counter 136 is zero, as indicated by complemented output 159 of OR gate 228 having the bits of lock counter 136 as inputs.

Register reg[ra] 166 contains a virtual address to be accessed. The virtual page address is translated by virtual memory subsystem 182 to a physical page address which is presented to cache 142 together with the unchanged line and word components of the address in reg[ra], which are the same for the physical address. For correct alignment of the address, its three least-significant bits should be zero and signal badAlign 160 generates a trap if they are not all zero. Signal validCacheAddr 158 from virtual memory subsystem 182 is used to generate a trap if the physical address is not a valid cacheable address. The data held in register reg[rb] 234 is written at the address specified by register reg[ra] 166 if the cache line is owned and an exit code SAME or FAIL is loaded into register reg[rc] by multiplexer 238 depending on whether the operation was successful. A trap is generated by signal 211 if the hold bit 208 is zero. The PostStore16 instruction illustrated in FIGS. 12A–B is similar to the PostStore8 instruction the only difference being that single register reg[rb] 234 is replaced by a pair of registers reg [rb+0] 240 and reg[rb+1] 242 whose data is written to two contiguous memory locations sixteen byte aligned as a pair, one of which has the virtual address in reg[ra].

TABLE 9A

Most efficient SameCSwap sequence, CPU_NONE
/* Most efficient use is as follows */
start:
    owned1 = !OWNED;
    owned2 = !OWNED;
loop:
    PrepLoad8(address1, data1, owned1, &first);
    if (first != data1) goto fail;
    /* read addr2 */
    NextLockCSwap8(address2, next, test, &data, &fail, owned2);
    if (fail == SAME) goto done;
    if (fail == FAIL) goto lost;
    fail = SAME;
    /* update specific instructions go below */
    if (data != test) goto done;    /* update specific */
    PostStore8(address2, next, &fail);    /* update specific */
    /* end of update specific instructions */
    if (fail != FAIL) goto done;
    /* Failures could be due to shared second-address copy */
    if (owned2 == OWNED) goto error;
    owned2 = OWNED;
    goto loop;
lost:
    if (owned1 == OWNED) goto done;
    if (!SameLine(address1, address2)) goto done;
    owned1 = OWNED;
    goto loop;
fail:
    fail = FAIL;
done:
    /* Other instructions */
error:
    /* print error message and save core image for diagnostic purposes */

TABLE 9B

Simplest SameCSwap sequence, CPU_NONE
    /* Simplest use is as follows */
start:
    PrepLoad8(address1, data1, OWNED, &first);
    if (first !=data1) goto fail;
    NextLockCSwap8(address2, next, test, &data, &fail, OWNED);
    if (fail == SAME) goto done;
    if (fail == FAIL) goto done;
    fail = SAME;
    /* update specific instructions go below */
    if (data != test) goto done;    /* update specific */
    PostStore8(address2, next, &fail);    /* update specific */

TABLE 9B-continued

/* end of update specific instructions */
    if (fail == FAIL) goto error;
    goto done;
fail:
    fail = FAIL;
done:
    /* Other instructions */
error:
    /* print error message and save core image for diagnostic purposes */

TABLE 10

Update specific instructions
COMPARE_SWAP_8
    if (data != test) goto done;
    PostStore8(address2, next, &fail);
MASK_SWAP_8
    plus = test & next; /* this could be precomputed */
    base = (data & ~test);
    new = base | plus;
    PostStore8(address2, new, &fail);
FETCH_ADD
    new = data + next;
    PostStore8(address2, new, &fail);
LESS_STORE_16
    sum = old - next;
    if (sum < 0) goto done;
    PostStore16(address2, next, test, &fail);
ZERO_STORE_16
    if (sum != 0) goto done;
    PostStore16(address2, next, test, &fail);
COMPARE_FILL_16
    if (data != test) goto done;
    PostStore16(address2, next, ZERO, &fail);
WORD_LOAD_8
    /* there is no modification */
WORD_STORE_8
    PostStore8(address2, next, &fail);
PAIR_STORE_16
    PostStore16(address2, next, test, &fail);

To ensure forward progress, the initial conditional-lock instructions, Prep2Test8, PrepTest8, and PrepLoad8, set a lock counter value to a small initial value (typically 15 or less) as discussed above. The lock value affects the execution of the following Post2Lock, PostLock, NextLock, and PostStore instructions, which trap if the lock value is zero. The Post2Lock, PostLock and PostStore instructions clear the lock value to zero. To avoid deadlocks, a lock must be released on any instruction (other than Post2Lock, Post-Lock, or NextLock) which requires cache-line updates. Instructions are expected to be placed within a single cache line, to avoid generation of instruction-cache misses during the execution of the lock instruction sequence.

In the implementations described so far, the processor stalls on cache misses. As the cache miss penalty (as measured in processor cycles) continues to increase, it may become more efficient to context switch (switch processes being executed by the processor) on a cache-line fault so that processing occurs while the cache line is being fetched.

Processors which context switch on a cache-line fault offload their memory access request to another hardware component, typically a cache controller that manages coherence communications on the multiprocessor interconnect. When the cache line is available the cache controller can immediately perform the update, before the initiating process is resumed. This ensures forward progress, by eliminating the possibility of cache-line rollout before the initiating process is rescheduled.

Within this environment, we assume that a cache-line fault causes the processor (such as processor 28 of FIG. 1A) to save context (variables that fully characterize the process state) in local (noncoherent) memory 30. The memory-access parameters are then passed to the cache-control hardware 34, along with a pointer to the process context located in local memory. In preparation for the returned cache line, the conflicting cache line (if any) is deleted from the cache 32. The cache controller is typically responsible for updating cache-line state, in preparation for the requested cache-update operation.

When the affected cache line(s) have been fetched, the cache-control hardware 34 performs the memory-access updates, saving the results in the process context in local memory 30 using the pointer previously provided by processor 28. The cache lines are then placed into cache storage 32 (if an empty line is available) and the processor is signalled that the requested memory access has completed.

The detailed nature in which the cache-fault handling is performed is likely to be highly implementation dependent. For all implementation options, the conditional-lock instructions contain the parameters that allow the lock operation to be offloaded in this fashion. This capability is not provided by the LoadReserved and StoreConditional instructions, due to the difficulty of offloading a sequence of (nearly) arbitrary processor instructions.

Offloading the conditional lock operation on a cache miss also provides support for direct-mapped caches. If the two addresses within the conditional lock operation map to the same cache entry, one of these two accesses generates a cache miss. Although the processor may have only a single-set associative cache, the bus interface (which processes the offloaded lock operation) can easily support a few cache entries with two-set associativity.

With software cache-fault handling, the standard memory-access instructions generate an immediate trap when the addressed cache entry cannot be used. The trap handler (or the process of executing the trap) is expected to initiate the corresponding memory transactions to change the cache line to the desired state.

A deferred trap is preferred for the initial conditional-lock instructions (Prep2Test8, PrepTest8, and PrepLoad8), so that the trap can be taken when the following (Post2Lock, PostLock, or NextLock) instruction is executed. This provides the trap handler with all of the parameters necessary to complete the specified conditional lock operation.

Figure 13:
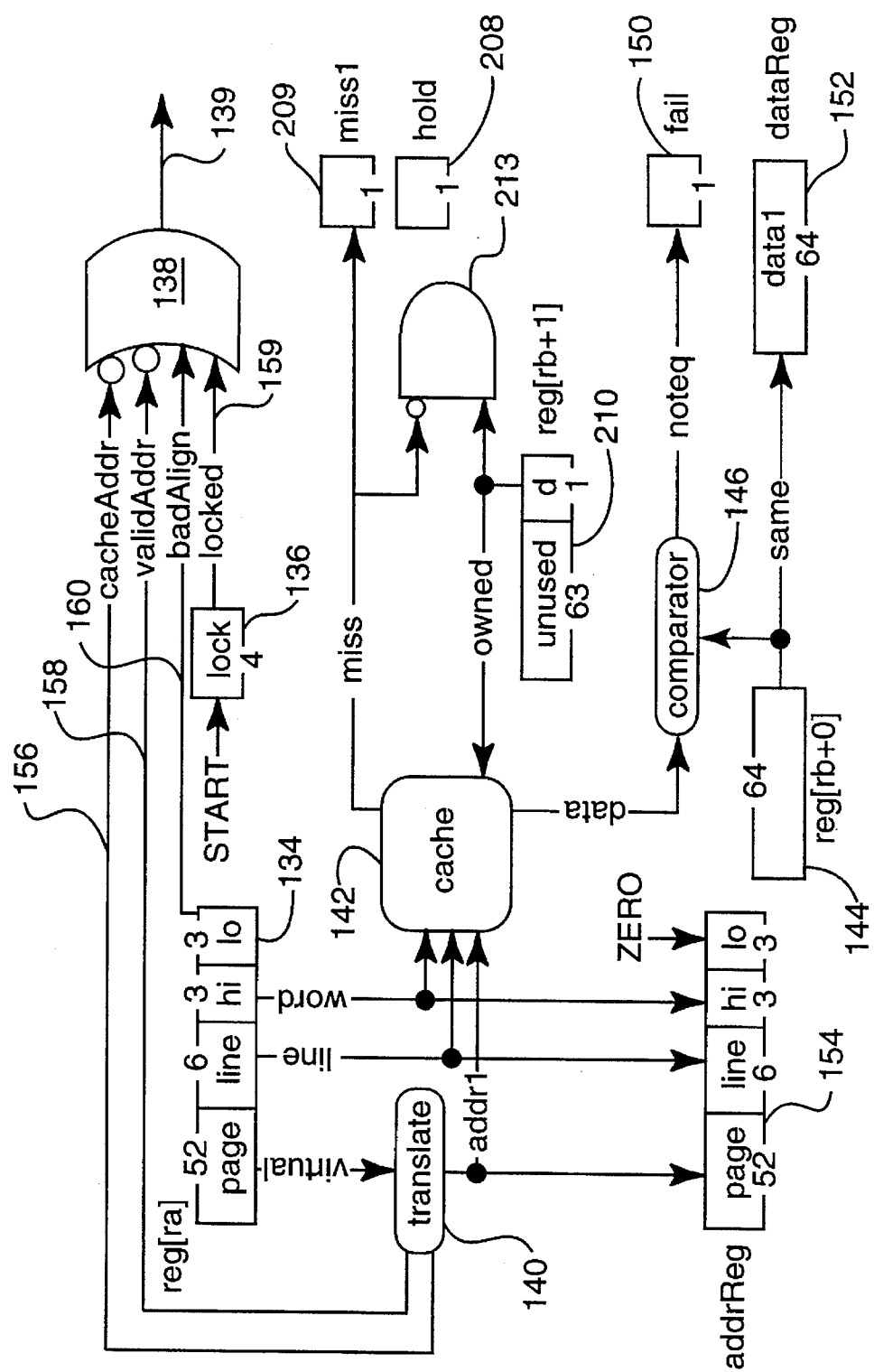
FIG. 13 is a block diagram of part of the hardware needed to execute the PrepTest8 instruction with context switching on cache misses.

Although the application interface shown in Tables 6–9B does not change, software cache-fault handling affects the execution of the conditional lock instructions. The behavior of the PrepTest8 instruction of FIG. 7B is modified to save the cache-miss condition in a miss1 state bit or register 209, as shown in FIG. 13. The cache miss inhibits the setting of the hold bit or register 208, since there is no cache line to be held. The physical address is saved in addrReg 154 and the test data is saved in special purpose register dataReg 152, for the use by the deferred cache-miss handler. Gate 213 allows hold bit or register 208 to be set only on cache hits.

On a cache hit, the operation is the same as for the PrepTest8 instruction that stalls on cache misses described above. Register reg[ra] contains the virtual address of a memory location whose content is to be compared to the content of register reg[rb+0] 144. The least-significant bit or register reg[rb+1] 210 indicates whether the comparison shall be performed on an owned line. If the comparison is to be performed on an owned line, a hold bit or register 208 is set using an owned signal to ensure that the cache line or reg[ra] is locked (preventing loss of cache line ownership) until the next PostLock8 instruction is reached or lock counter 136 is set to zero.

A lock counter or register 136 is set, and a trap is generated if the lock counter output was not initially zero. The trap is generated by the locked input 159 to trap OR gate 138 whose output 139 triggers a trap whenever one or both of inputs 156 cacheAddr and 158 validAddr is zero or if input 159 locked or 160 badAlign are 1.

Lock counter 136 is set to zero on loads, stores and taken branches. On ALU operations and not-taken branches, lock counter 136 is decremented if not zero and kept at zero if zero. Interrupts are disabled when the lock counter is not zero. For the PrepTest8 instruction, the START value, to which lock counter 136 is set, is 1.

The contents of reg[ra] 134 specified by the instruction is interpreted as a virtual address and its virtual page address is translated by virtual memory subsystem 140 into a physical page address addr1. Signals 156, 158 and 160 are used to generate a trap if the address is not valid, not cacheable, or if the address alignment is incorrect (the three least-significant bits are not zero). The physical address, given by signals addr1, line, and word, is presented to cache 142 and, with the exception of the three least-significant bits which should be zero, stored in special purpose register addrReg. The data at the physical address is presented to comparator 146. Comparator 146 compares the data in the cache with the contents of register reg[rb+0]. If the two values are not equal, fail bit or register 150 is set.

All the above-discussed trap signals 156, 158, 159 and 160 are combined by OR gate 138. Not shown is the hardware for processing the trap signal 139 output by OR gate 138. This signal is assumed to abort the instruction and inhibits storage updates. Depending on the implementation, the values of the inputs to OR gate 138 or an encoded version of them, may be saved for use by the trap-handling software.

Special processing of PrepTest8 address-translation traps is required to support the PostLock lock operation semantics. If the address-translation trap is generated by a bad PrepTest8 address (as opposed to an unloaded page-table entry), the trap handler emulates the following PostLock instruction, generating a distinct bad-status code, and returns control to the instruction following the PostLock instruction.

Figure 14:
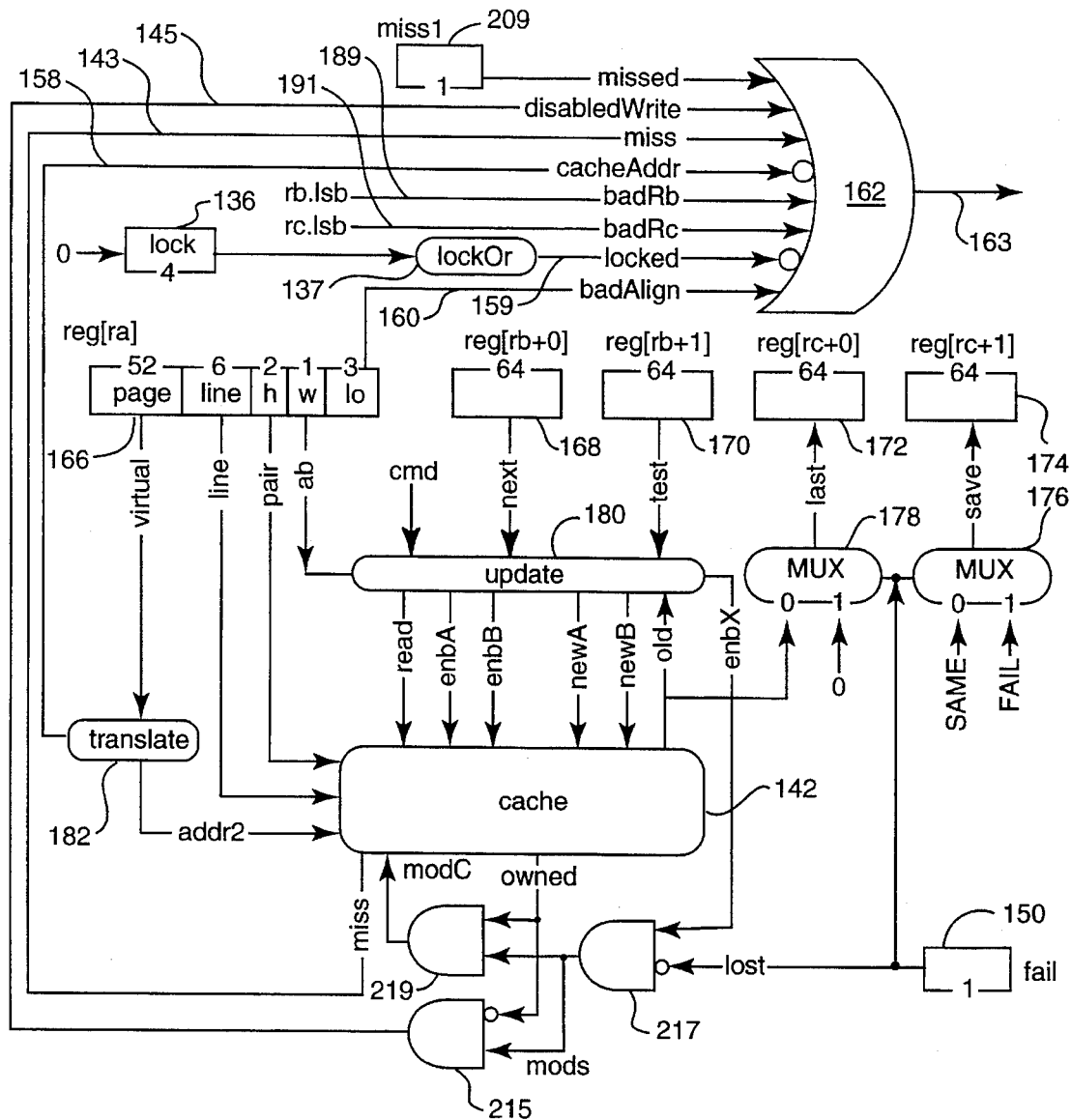
FIG. 14 is a block diagram of part of the hardware needed to execute the PostLock instruction with context switching on cache misses.

For software cache-fault handling, the behavior of the PostLock instruction described in FIG. 8B is modified to detect the previous as well as the current cache-miss conditions, as shown in FIG. 14. In particular, miss1 bit or register 209 is input to OR gate 162 as signal missed, as is miss signal 143 generated by cache 142. For data modifications, a trap is generated by signal disabledWrite 145 generated by gates 215 and 217 if valid data is cached but it is not owned and therefore it cannot be immediately modified. Gates 217 and 219 allow cached data to be modified if it is owned.

On cache hits, the operation of the PostLock instruction is the same as that of the PostLock instruction with stalls on cache misses described above with reference to FIG. 8B. Register reg[ra] 166 contains a virtual address to be accessed. The virtual page address is translated by virtual memory subsystem 182 to a physical page address addr2 which is presented to cache 142. Registers reg[rb+0] 168 and reg[rb+1] 170 contain data to be used by update circuit 180, described above, to perform the instruction. Register reg[rc+0] 172 is set by multiplexer 178 to zero or to the old data provided by cache 142 depending on the value of fail bit or register 150. This value also determines, via multiplexer 176, whether register reg[rc+1] 174 is set to SAME or to FAIL. The lock register updates for the PostLockStore8 and PostLockStore16 are slightly different, in that the reg [rc+0] register 172 is set to zero because the old data value is not returned by these instructions. As before, this is accomplished by setting read output of update logic 180 to zero, which causes the cache output old to be zero instead to the value at the address in reg[ra].

Or gate 162 triggers a trap if the rb and rc registers are incorrectly aligned as discussed above (as indicated by signals badRb 189 and badRc 191), if lock counter 136 is initially zero (as indicated by the output locked 159 of lockOr gate 137), or if the address in register reg[ra] is incorrectly aligned or otherwise invalid (as indicated by signals cacheAddr 158 and badAlign 160). To ensure forward progress, the trap handler is expected to load page-translation tables with the entries for addr1 and addr2 addresses before resuming execution at the initial PrepTest8 instruction, requiring a three-way associative shared instruction-data translation look-aside buffer (TLB) or a split instruction TLB with a two-way data TLB.

Update logic 180 was described above in the discussion of the CPU_REDO implementation.

The current modify signal affects the data updates and invalidates other copies of the cache line in other caches, converting the line from owned to exclusive.

At the end of the instruction, the lock counter is reset to reenable interrupts.

Figure 15:
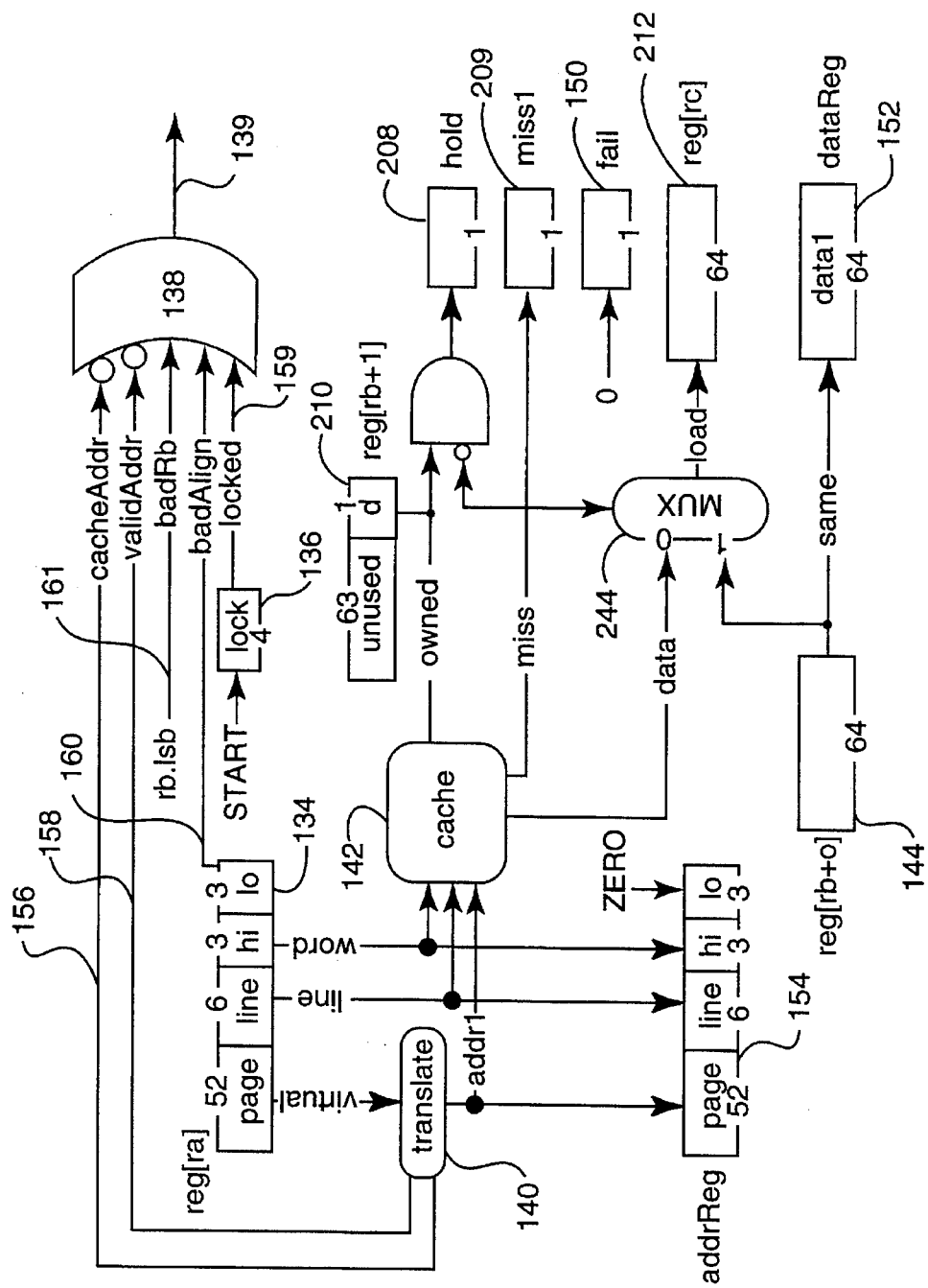
FIG. 15 is a block diagram of part of the hardware needed to execute the PrepLoad8 instruction with context switching on cache misses.

Similar to the PrepTest8 modification, the behavior of the PrepLoad8 instruction of FIG. 9B is modified to save the cache-miss condition in a miss1 state bit or register 209, as shown in FIG. 15. The cache miss inhibits the setting of the hold bit or register 208, since there is no cache line to be held. The physical address is saved in addrReg 154 and the test data is saved in special purpose register dataReg 152, for the deferred cache-miss handler. In the case of a cache miss, register reg[rc] 212 is loaded with test data from reg[rb+0] 144 rather than data from cache 142, to ensure that the first-address comparison succeeds and the following NextLock instruction will be executed. This is accomplished using multiplexer 244.

The operation on cache hits is similar to that of the PrepLoad8 instruction with stalls on cache misses described above.

A lock counter or register 136 is set, and a trap is generated if the lock counter output was not initially zero. The trap is generated by the locked input 159 to trap OR gate 138, whose output 139 triggers a trap whenever one or both of inputs 156 cacheAddr and 158 validAddr are zero, or if input 159 locked, 160 badAlign or 161 badRb are 1.

Lock counter 136 is set to zero on loads, stores and taken branches. On ALU operations and not-taken branches, lock counter 136 is decremented is not zero and kept at zero if zero. Interrupts are disabled when the lock counter is not zero. For the PrepLoad8 instruction, the START value, to which lock counter 136 is set, must be 2 or larger, depending on the number of processor instructions required to perform the intermediate data-value comparisons.

The contents of reg[ra] 134 specified by the instruction is interpreted as a virtual address and the virtual page address is translated by virtual memory subsystem 140 into a physical page address addr1. Signals 156, 158, 160 and 161 are used to generate a trap if the address is not valid, not cacheable, if the address alignment is incorrect, or if the rb register specifier is not even. All but the three least-significant bits of the physical address is saved in special purpose register addrReg 154 and presented to cache 142. The data from cache 142 is saved in reg[rc] 212. The least-significant bit of reg[rb+1] 210 indicates whether the comparison shall be performed on an owned line. If so, the cache line at the address in reg[ra] is locked (preventing loss of cache line ownership) until the next PostLock8 instruction, which was described above, is reached or until lock counter 136 is set to zero, by setting a hold bit or register 208. Fail bit or register 150 is set to zero.

All the above-discussed trap signals are combined by OR gate 138. Not shown is the hardware for processing the trap signal output by OR gate 138. This signal is assumed to abort the instruction and inhibits storage updates. Depending on the implementation, the values of the inputs to OR gate 138 or an encoded version of them, may be saved for use by the trap-handling software.

Special processing of PrepLoad8 address-translation traps is required to support the PostLock lock operation semantics. If the address-translation trap is generated by a bad PrepLoad8 address (as opposed to an unloaded page-table entry), the trap handler emulates the following PostLock instruction, generating a distinct bad-status code, and returns control to the following instruction.

Register reg[rc] 212 is used to save the data read from cache 142. As shown in Table 8, the comparison for equality is done subsequently by the software, while lock counter 136 is not zero and interrupts are disabled. Following this, a PostLock instruction is executed as was described in the CPU_BOTH implementation.

From these examples, it can easily be seen how to modify the other implementations that stall on cache misses to instead switch context on cache misses.

The technique for invoking a special lock operation within a single instruction, such as TestSet or LoadClear, is well known and supported by several processor instruction sets. However, because these instructions require special hardware support, designers have been reluctant to support more than one lock instruction.

Multiple lock operations can be readily supported if the software-based lock-update technique is applied to the execution of basic (single-address) lock operations as well. The code within Table 11 illustrates the conditional-lock operation sequence that would be used in the case of CSwap8 (compare&swap). The PrepLock instruction locks and loads a memory address, similar to the NextLock instruction. A PostStore instruction is then used to update the address.

TABLE 11

Single address lock operation
    /* CSwap8 equivalent instructions */
    owned = !OWNED
loop:
    PrepLockCSwap8(address2, next, test, &data, &fail, owned);
    if (fail != MORE) goto done;
    if (data != test) goto done;
    PostStore8(address2, next, &fail);
    if (fail != FAIL) goto done;
    /* Failure caused by shared address? */
    if (owned == OWNED) goto error;
    owned = OWNED;
    goto loop;
done:
    /* other instructions */
error:
    /* print error message and save core image for diagnostic purposes */

Briefly, the PrepLock instruction accesses address2 in register reg[ra]. If address2 is not cacheable, it transfers the content of registers reg[ra], reg[rb+0] and reg[rb+1] and a specifier of the update to be performed to the bus interface. In either case, the old value in address2 is returned in register reg[rc+0] and a status code is returned in reg[rc+1]. If later executed, the PostStore instruction behaves as previously described. It stores a value held in reg[rb] or the pair reg[rb+0], reg[rb+1] into the memory address or pair including address2 held in reg[ra]. A status code is returned in reg[rc].

Figure 16A:
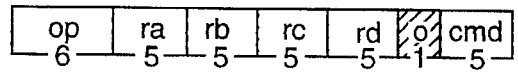
FIG. 16A is a diagram of the format of a PrepLock instruction.

As shown in FIG. 16A, the PrepLock instruction, of which PrepLockCSwap8 is a special case, may be 32 bits long and contain a 6-bit opcode, a 5-bit field cmd indicating the update type such as CSwap, an ra field which identifies the address register 134, an rb field which identifies a pair of argument registers reg[rb+0] 220 and reg[rb+1] 222, an rc field which identifies the returned-status registers reg[rc+0] 216 and reg[rc+1] 218, and an rd field which specifies the owner-value register reg[rd] 214.

A trap is generated by OR gate 162 with output 163 if the rb and rc register pair specifiers are not both even (as indicated by signals rb.lsb 189 and rc.lsb 191). A trap is also generated if lock counter 136 is not initially zero as indicated by signal locked 159, or if the address in register reg[ra] is incorrectly aligned (as indicated by signal badAlign 160) or invalid as indicated by complemented signal validAddr 158.

Register reg[ra] 166 contains a virtual address to be accessed. The virtual page address is translated by virtual memory subsystem 182 to a physical page address. All but the three least-significant bits of the full physical address are stored in register addrReg 154 and presented to cache 142.

For cacheable addresses, the instruction ensures that the memory address specified in register reg[ra] 134 is cached in cache 142. The least-significant bit of register reg[rd] 214 specifies whether the cache line should be owned. If the address is not cacheable, the instruction and the data in registers 134, 220, 222, and 218 are sent to be executed by the bus interface, which performs the update operation, similar to the discussion for the NextLock instruction.

Figure 16B:
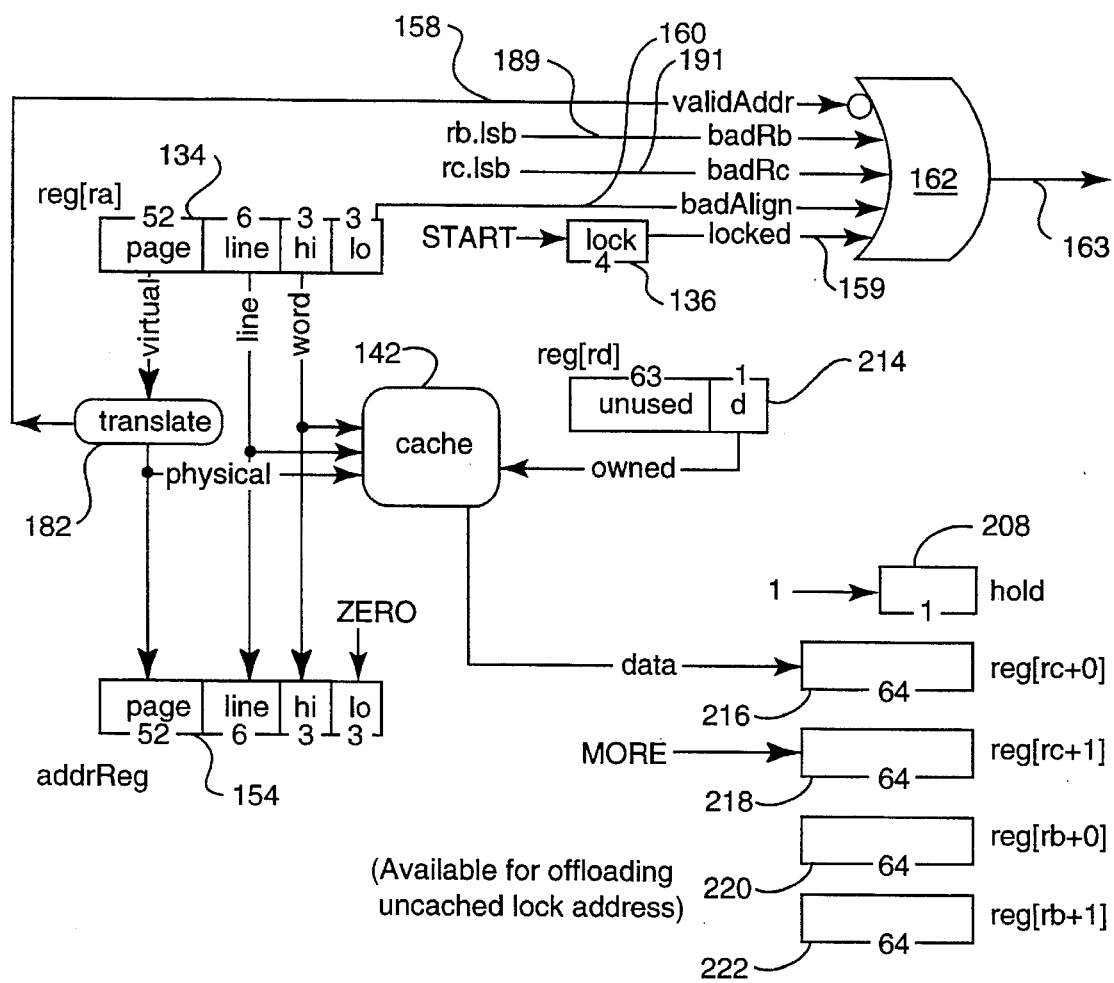
FIG. 16B is a block diagram of part of the hardware needed to execute the PrepLock instruction.

With reference to FIG. 16B, note that reg[rb+0] 220 and reg[rb+1] 222 values are not used when a cached line is accessed, but are provided to support offloading (to the bus interface) of uncached transactions. The returned status indicates whether the data is locked in the cache (fail, the content of reg[rc+1] 218, is MORE), or was offloaded and the lock transaction has completed (fail is not MORE).

If the address is cacheable but the desired cache line is not cached in the desired ownership state, the hold bit or register 208 is cleared and the cache line is fetched or converted to the proper state. Once the addressed cache line is available, hold bit or register 208 is set to 1 (which inhibits changes in ownership) and the addrReg physical address value is updated using the reg[ra] virtual address value. Hold register or bit 208 is cleared when lock counter 136 is set to zero. As in the case of the conditional lock instructions, lock counter 136 is set to a value to provide short term interrupt disablement.

Lock counter 136 is set to zero on loads, stores and taken branches. On ALU operations and not-taken branches, lock counter 136 is decremented is not zero and kept at zero if zero. Interrupts are disabled when the lock counter is not zero. For the PrepLock instruction, the START value, to which lock counter 136 is set, must be 2 or larger, depending on the number of processor instructions required to perform the intermediate data-value comparisons.

In summary, processors and methods for locked memory updates and process synchronization without locking of arbitrary duration of the entire shared data structure have been described. The calculation and update of the data structure may continue after a context switch. The present invention is compatible with a wide range of cache-coherence protocols.

The present invention has been described in terms of a preferred embodiment. The invention, however, is not limited to the embodiment depicted and described. Rather, the scope of the invention is defined by the appended claims.

What is claimed is:

1. A processor having a set of machine language instructions for executing a sequence of processor instructions without interruption comprising:

a plurality of general-purpose registers;

an arithmetic logic unit;

switching means for interconnecting said general-purpose registers and said arithmetic logic unit;

a lock register; and a control unit for activating said switching means to coordinate execution of said machine language instructions, said control unit being in an interrupt-disable condition which does not service interrupts when said lock register contains a locked value, and in an interrupt-enable condition which does service interrupts when said lock register contains an unlocked value, and wherein each of said machine language instructions belongs to one of three sets, a first set of instructions setting the lock register to a locked value interrupt-disable condition to ensure indivisible execution of a second subset of instructions and of a third subset of instructions, said first subset generating a trap if said lock register contained a locked value when execution of said first set began, whereby an error condition is detected for attempting to set tile interrupt-disable condition when it had already been set, said second set of instructions limiting the duration of said interrupt-disable condition by changing the lock register in a predetermined way when it contains a locked value, and leaving the lock register unchanged when it contains an unlocked value, and said third set of instructions terminating said interrupt-disable condition by setting the lock register to an unlocked value, and wherein a subset of the third set of instructions is used only during the interrupt-disable condition to generate a trap if said lock register did not contain a locked value when said third set began, whereby an early loss of said interrupt-enable condition may be detected.

2. The processor claim 1, wherein the third set of instructions, but not its subset, includes loads, stores and taken branches, and wherein the second set of instructions includes arithmetic logic unit operations and not-taken branches.

3. A method for updating a memory address using a sequence of machine language instructions executed in a locked fashion comprising:

(a) as part of a first machine language instruction, determining whether a first address may be fetched into a cache, wherein said first address is cached with owned status and a hold register is set to a predetermined first value to maintain the owned status if an instruction-specific register has a second value indicating said first address should be cached and held in an owned state;

(b) as part of said first machine language instruction, if said first address may not be fetched into said cache, offloading predetermined parameters to a bus interface for an uncached memory access;

(c) as part of said first machine language instruction, if said first address is cacheable, reading its content and setting a lock register to disable interrupts until a subsequent machine language instruction is executed;

(d) as part of said subsequent machine language instruction, if said lock register remains set to a value disabling interrupts and a cache line of said first address is still valid, accessing said first or a second memory address contained within a same cache line as said first address; and (e) as part of said subsequent machine language instruction, changing said lock register to a value allowing interrupts.

4. A method for updating a memory address in a locked fashion, comprising:

(a) as part of a first machine language instruction, determining whether a first address may be fetched into a cache and generating a trap if the first address may not be fetched into said cache;

(b) as part of the first machine language instruction, setting a lock register to disable interrupts, reading the first address, comparing its content with that of a first register, and setting a fail register to a predetermined first value if they are not equal and setting up the fail register to be set to said predetermined first value if the cache line of the first address becomes invalid before the lock register is set to a value allowing interrupts;

(c) as part of a second machine language instruction, generating a trap if the lock register is already set to a value allowing interrupts;

(d) as part of the second machine language instruction, if a second address may not be fetched into the cache, offloading predetermined parameters to a bus interface for an uncached memory access;

(e) as part of the second machine language instruction, if the second address may be fetched into the cache, reading the second address into a second register;

(f) as part of the second machine language instruction, if the second address may be fetched into the cache, determining whether the second address should be updated if the fail register is not set to said predetermined first value;

(g) as part of the second machine language instruction, if the second address should be updated and the fail register is not set to said predetermined first value, generating an update value and updating the second address; and (h) as part of the second machine language instruction, setting the lock register to a value allowing interrupts.

5. The method of claim 4, wherein in step (f) if the fail register is set to said predetermined first value and the second address and the first address are in the same cache line, the content of the first address is recompared with the content of the first register.

6. The method of claim 4 wherein said first address is cached with owned status and a hold register is set to a predetermined second value to maintain the owned status if a third register has a predetermined third value, wherein said predetermined first, second and third values may be the same or different from each other.

7. A method for updating a memory address in a locked fashion, comprising:

(a) as part of a first machine language instruction, determining whether a first address may be fetched into a cache and generating a trap if the first address may not be fetched into the cache;

(b) as part of the first machine language instruction, setting a lock register to disable interrupts, reading the first address into a first register, and setting up a fail register to be set to a predetermined first value if the cache line of the first address becomes invalid before the lock register is set to a value allowing interrupts;

(c) as part of a first set of machine language instructions, comparing the content of the first register with that of a second register, and branching if they are not equal;

(d) as part of a second machine language instruction, generating a trap if the lock register is already set to a value allowing interrupts;

(e) as part of the second machine language instruction, if a second address may not be fetched into the cache, offloading predetermined parameters to a bus interface for an uncached memory access;

(f) as part of the second machine language instruction, if the second address may be fetched into the cache, reading the second address into a second register;

(g) as part of the second machine language instruction, if the second address could be fetched into the cache, determining whether the second address should be updated if the fail register is not set to said predetermined first value;

(h) as part of the second machine language instruction, if the second address should be updated and the fail register is not set to said predetermined first value, generating an update value and updating the second address; and (i) as part of the second machine language instruction, setting the lock register to a value allowing interrupts.

8. The method of claim 7 wherein said first address is cached with owned status and a hold register is set to a predetermined second value to maintain the owned status if a third register has a predetermined third value, wherein said predetermined first, second and third values may be the same or different from each other.

9. A method for updating a memory address in a locked fashion, comprising:

(a) as part of a first machine language instruction, determining whether a first address may be fetched into a cache and generating a trap if the first address may not be fetched into the cache;

(b) as part of the first machine language instruction, setting a lock register to disable interrupts, reading the first address into a first register, and setting a fail register to a predetermined first value if the cache line of the first address becomes invalid before the lock register is set to a value allowing interrupts;

(c) as part of a first set of machine language instructions, comparing the content of the first register with that of a second register, and branching if they are not equal;

(d) as part of a second machine language instruction, generating a trap if the lock register is already set to a value allowing interrupts;

(e) as part of the second machine language instruction, if a second address may not be fetched into the cache, offloading predetermined parameters to a bus interface for an uncached memory access;

(f) as part of the second machine language instruction, if the second address may be fetched into the cache, reading the second address into a second register;

(g) as part of a second set of machine language instructions, if the second address could be fetched into the cache, determining whether the second address should be updated if the fail register is not set to said predetermined first value;

(h) as part of the second set of machine language instruction, if the second address should be updated if the fail register is not set to said predetermined first value, generating an update value;

(i) if the second address should be updated, as part of a third machine language instruction, updating the second address if the fail register is not set to said predetermined first value; and (j) as part of the third machine language instruction, setting the lock register to a value allowing interrupts.

10. The method of claim 9 wherein said first address is cached with owned status and a first hold register is set to a predetermined second value to maintain the owned status if a third register has a predetermined third value, and said second address is cached with owned status and a second hold register is set to a predetermined fourth value to maintain the owned status if a fourth register has a predetermined fifth value wherein said predetermined first, second, third, fourth and fifth values may be the same or different from each other.

11. The method of claim 4, 5, 6, 7, 8, 9 or 10 wherein the second machine language instruction generates a trap if there was a cache miss on accessing the first or second addresses.

12. The method of claim 4, 5, 6, 7, 8, 9, or 10 wherein caches provide two or more sets of storage locations, a record of which of said sets contains said first address is stored in a select register, and said second address is fetched into a set other than that saved in the select register.

13. The method of claim 4, 5, or 6 wherein a handler of the trap generated if said first address may not be fetched into the cache emulates the second machine language instruction executed with the fail register set to said predetermined first value and continues execution at an instruction following said second machine language instruction.

14. The method of claim 4, 5, 6, 7, 8, 9 or 10 wherein if a page of said second address is not in physical memory a trap is generated, a handler of said trap loading into physical memory a page of said first address, a page of said second address and a page of said first machine language instruction and continues execution at said first machine language instruction.

* * * * *